(12) United States Patent
Kobayashi et al.

(10) Patent No.: US 8,037,851 B2
(45) Date of Patent: Oct. 18, 2011

(54) HEAT ACCUMULATOR AND ENGINE

(75) Inventors: Hideo Kobayashi, Mishima (JP); Katuhiko Arisawa, Gotenba (JP); Kenichi Yamada, Yaizu (JP); Yoshio Yamashita, Toyota (JP); Kunihiko Hayashi, Odawara (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 712 days.

(21) Appl. No.: 12/278,641

(22) PCT Filed: Feb. 8, 2007

(86) PCT No.: PCT/JP2007/052663
§ 371 (c)(1),
(2), (4) Date: Aug. 7, 2008

(87) PCT Pub. No.: WO2007/091729
PCT Pub. Date: Aug. 16, 2007

(65) Prior Publication Data
US 2009/0031978 A1    Feb. 5, 2009

(30) Foreign Application Priority Data
Feb. 9, 2006  (JP) ................... 2006-033133

(51) Int. Cl.
*F01P 11/02* (2006.01)
(52) U.S. Cl. .................. 123/41.14; 123/142.5 R
(58) Field of Classification Search ............... 123/41.14, 123/142.5 R
See application file for complete search history.

(56) References Cited

FOREIGN PATENT DOCUMENTS
JP   11-182393 A   7/1999
JP   2003-129844 A   5/2003

*Primary Examiner* — Noah Kamen
(74) *Attorney, Agent, or Firm* — Sughrue Mion, PLLC

(57) ABSTRACT

A heat accumulator (1) is formed by connecting a first container (4) and a second container (5) using a spring (6). The first container (4) has a wall-shaped inner side wall that corresponds to the shape of a cylinder bore wall (7). Provided on this inner side wall is a flexible structural part (8). The flexible structural part (8) is formed of highly elastic resin. The second container (5) has a similar structure. A heat storage medium within the first container (4) and the second container (5) absorbs heat, which generates a change of phase from a solid to a liquid. When this happens, the volume of the heat storage medium increases. The increase in the heat storage medium projects the flexible structural part (8), and separates the first container (4) and the second container (5) from the cylinder bore wall (7).

19 Claims, 18 Drawing Sheets

HEAT ACCUMULATOR AND ENGINE

TECHNICAL FIELD

The present invention relates to a heat accumulator capable of effectively warming up an engine.

BACKGROUND ART

Due to problems such as considerable friction in the engine when not completely warmed up, warming up of the engine must be quickly completed. The early completion of warming up is especially desirable in order to achieve efficient operation by structural components with sliding parts, including the cylinder bore, piston, and crankshaft. Normally in an engine, once in-cylinder explosion has begun, engine structural components including the cylinder block and cylinder heads, as well as engine oil circulating in oil passages that are formed in these engine structural components become heated as warming up gradually progresses. To complete early warming up of such an engine in the past, an engine rapid warming up device has been proposed in which a heat storage medium is stored in a heat storage material storage chamber that is formed so as to surround the cylinder, and the heat storage medium cooled excessively starts a change of phase and heats up (Patent Document 1). The heat storage medium has characteristics such as the following. First, the heat storage medium is heated by the engine during operation and stores heat. At this time, the heat storage medium is a liquid if the temperature of the heat storage medium corresponds to the melting point thereof or higher. Thereafter, once the engine is stopped and the engine temperature decreases, the temperature of the heat storage medium also decreases. In such case, the heat storage medium does not experience a change of phase and maintains its liquid state despite the temperature falling below the melting point, and the accumulated heat is thus preserved as latent heat. In other words, the heat storage medium is excessively cooled. Then when a change of phase is triggered in the excessively cooled heat storage medium, the accumulated heat is released while a change of phase occurs from a liquid to a solid. The released heat is used to warm up the engine. The heat storage medium, which has completed a change of phase from a liquid to a solid, is heated up by the engine during operation and absorbs combustion heat and the like from the engine so as to accumulate heat again. In the engine rapid warming up device according to Patent Document 1, such a heat storage medium is accommodated in the heat storage material storage chamber provided around the cylinder in order to warm up the engine.

Meanwhile, an engine is normally mounted with a cooling mechanism such as a water jacket that circulates coolant. Regarding this point the description of the engine rapid warming up device according to Patent Document 1 notes that the heat storage material storage chamber is formed around the cylinder of the cylinder block, and the heat absorption effect of the heat storage medium accommodated in the heat storage material storage chamber cools the cylinder block side. Patent Document 1 further notes that the cylinder head side is cooled by the forced circulation of coolant flowing through the water jacket. It should also be noted that an embodiment is disclosed in Patent Document 1 wherein the water jacket is provided on the upper side of the heat storage material storage chamber.

Patent Document 1: Japanese Patent Application Publication No. JP-A-H11-182393

DISCLOSURE OF THE INVENTION

Problem to be Solved by the Invention

However, the engine rapid warming up device according to Patent Document 1 as described above releases latent heat as a result of a change of phase from an excessively cooled liquid state to a solid state. Once this is completed, a heat absorption effect accompanies a change of phase back to the liquid state. Such a heat absorption effect steals heat from the engine cylinder block, thus creating the risk of having an adverse effect on early warm-up efficiency. To be more specific, the heat absorption effect at a timing where engine cooling is needed, such as during high-load, high-speed operation of the engine, is effective for cooling the engine. However, at a timing where warming up is still not complete and the combustion heat and the like of the engine have yet to contribute to warming up the engine, the heat storage medium disposed around the cylinder may actually steal heat from the cylinder block and interfere with warming up the engine.

Furthermore, in the engine rapid warming up device according to Patent Document 1, coolant is not present between the cylinder and the heat storage medium. Therefore, in terms of a requirement for efficient engine cooling, it may be difficult to achieve a suitable cooling effect.

Hence, it is an object of the present invention to provide a heat accumulator that is capable of achieving early warming up of an engine and also capable of obtaining an efficient cooling effect for the engine.

Means for Solving the Problem

In order to solve the above problem, a heat accumulator according to the present invention is characterized by including a container that is accommodated inside a water jacket, which is provided so as to surround a cylinder bore wall; a heat storage medium that is enclosed within the container; and clearance adjustment means for adjusting a clearance between the container and the cylinder bore wall depending on an operating condition of an engine. Once such clearance adjustment means operates, it is possible for the heat storage medium enclosed in the container to contact the cylinder bore wall, and further possible to separate the heat storage medium from the cylinder bore wall at an appropriate timing. As a consequence, efficient early warming up of the engine can be achieved. In addition, a suitable cooling effect can be secured by flowing coolant between the container and the cylinder bore wall after warming up is completed when under strict thermal operating conditions. Here, parameters for operating the clearance adjustment means may be heat storage medium and coolant temperatures.

Note that any substance may be employed as the heat storage medium, provided that it is capable of achieving an excessively cold state and capable of drawing in latent heat if a predetermined core generating condition, i.e., a condition for initiating a change of phase from the excessively cold state, is met. For example, sodium acetate trihydrate ($CH_3COONa.3(H_2O)$) may be employed.

The container in the heat accumulator described above may be formed including a plurality of containers having wall shapes that respectively correspond to an outer peripheral shape of the cylinder bore wall. The water jacket accommodating the containers of the present invention is formed so as to surround the cylinder bore wall. Therefore, a cross-sectional shape of the water jacket taken as a cross section in a direction forming a right angle with the sliding direction of the piston with respect to the cylinder is, for example, a ring shape in the case of a single cylinder engine. Furthermore, in the case of an in-line four-cylinder engine, a shape that links four rings in a series is conceivable. By using a plurality of containers with respect to a water jacket shaped in this manner, it is possible to facilitate separating and pressing operations against the cylinder bore wall. Also, by giving the wall shape of the containers a shape that corresponds to the outer peripheral shape of the cylinder bore wall, it is possible to realize close contact between the containers and the cylinder bore wall as well as high heating efficiency. Note that compared to the width of the water jacket, that is, a distance from the cylinder bore wall to an outer wall of the cylinder block, the containers have a narrow width. By adopting such a dimensional relationship, the containers can closely contact and separate from the cylinder bore wall. The plurality of containers may also, for example, be formed having a first container and a second container with wall shapes that correspond to a shape of the cylinder bore wall. Provided that at least such a two-piece structure is employed, the containers can closely contact and separate from the cylinder bore wall.

According to the heat accumulator described above, the clearance adjustment means may have a structure provided with the containers. Adopting a structure in which the clearance adjustment means is provided with the containers facilitates installation of the heat accumulator in the engine, namely, attachment of the heat accumulator to the cylinder block.

Here, the above-described container may have a structure including a plurality of containers having respective wall shapes that correspond to the outer peripheral shape of the cylinder bore wall. Such a plurality of containers may be structured as connected by a connecting member. A spring can be employed as the connecting member, for example. This connecting member may also be a structural component of the clearance adjustment means.

For example, the clearance adjustment means may be a structure including a spring that connects the plurality of containers forming the container, and a flexible structural part that is provided on a wall facing the cylinder bore wall of the plurality of containers and that projects outward in accordance with an expansion of the heat storage medium. With such clearance adjustment means, the attraction force of the spring corresponding to a connecting member puts the container in close contact with the cylinder bore wall. Meanwhile, the flexible structural part projecting outward to fulfill the role of a spacer, so to speak, separates the container from the cylinder bore wall. Here, the flexible structural part is formed of a material with more flexibility than a surrounding portion thereof so as to achieve outward projection upon expansion of the heat storage medium. The heat storage medium increases in volume due to a change of phase from a solid to a liquid. For example, if the heat storage medium is sodium acetate trihydrate, the volume increases by approximately 10% due to the change of phase from a solid to a liquid. Therefore, as the heat storage medium becomes a solid, latent heat is released from the excessively cold state. The heat storage medium subsequently absorbs heat such as combustion heat and effects a change of phase to a liquid. When this happens, the volume increase of the heat storage medium projects the flexible structural part. Thus, the container separates from the cylinder bore wall.

The clearance adjustment means may also be other structures. For example, the clearance adjustment means may be an expansion-contraction mechanism that expands and contracts depending on a temperature, and connects a plurality of containers that forms the container. Such an expansion-contraction mechanism may be formed from a shape-memory metal that expands and contracts depending on a temperature, and be a connecting member that connects the plurality of containers forming the container. This connecting member pulls the plurality of containers so as to closely contact the cylinder bore wall in a temperature region where the heat storage medium releases latent heat. Furthermore, in a temperature region where the heat storage medium has a heat absorption effect, this connecting member operates so as to widen a clearance between the plurality of containers and separate the container from the cylinder bore wall. The shape-memory metal may employ a conventionally known metal alloy. Another conceivable expansion-contraction mechanism may adopt a piezoelectric actuator, for example.

The clearance adjustment means may be another structure including a spring and a thermostat that connect the plurality of containers forming the container. The spring operates so as to pull the plurality of containers into closely contact the cylinder bore wall. Meanwhile, the thermostat operates so as to widen the clearance between the plurality of containers when a temperature reaches a predetermined temperature and a needle is projected, thus separating the container from the cylinder bore wall.

The clearance adjustment means may be yet another structure. For example, the clearance adjustment means may be a structure including a spring that mutually separates the plurality of containers forming the container, and an actuator that presses the plurality of containers toward the cylinder bore wall side. The spring in such a structure is set so as to generate a reaction force at an initial state. Accordingly, the container is separated from the cylinder bore wall in the initial state. Meanwhile, the actuator presses the container toward the cylinder bore wall side at will based on control means such as an ECU or the like.

A heat accumulator normally requires a core generating trigger in order to generate a change of phase of the heat storage medium enclosed within the container. Hence, in the case of a structure where the actuator presses the container toward the cylinder bore wall side, the actuator may have a structure adopted for the dual purposes of pressing the core generating trigger and pressing the container toward the cylinder bore side. In other words, the container is provided with core generating triggers that initiate a change of phase of the heat storage medium on side walls thereof. In such a structure, the plurality of containers may be connected by a spring, accommodated in the water jacket so as to separate from the cylinder bore wall due to the reaction force of the spring, and pressed toward the cylinder bore wall side while the core generating trigger is pressed by the actuator.

The actuator in the heat accumulator described above may be controlled as illustrated below. Namely, the actuator performs a pressing operation on the container when a coolant temperature is equal to or less than a melting temperature of the heat storage medium, and continues the pressing operation until the coolant temperature reaches a warm-up completion temperature. By performing such a control, when the heat storage medium releases latent heat, the actuator puts the container in close contact with the cylinder bore wall. Also, after the predetermined warm-up completion temperature is reached, the actuator stops the pressing operation and separates the container from the cylinder bore wall. Thus, it is possible to avoid the phenomenon of the heat storage medium stealing heat from the cylinder bore wall due to a heat absorption effect after releasing latent heat. As a consequence, early warming up of the engine can be achieved. Furthermore, under strict thermal conditions such as during high-load, high-speed operation of the engine, stopping the pressing operation of the actuator makes it possible to heighten the cooling effect for the engine.

By incorporating the heat accumulator described above into a conventional engine, an engine according to the present invention can be achieved.

Effects of the Invention

According to the present invention, when a heat storage medium releases latent heat, a container enclosing the heat storage medium closely contacts a cylinder bore wall; however, when the heat storage medium acts to absorb heat, the container separates from the cylinder bore side. Therefore, fully utilizing the characteristics of the heat storage medium make it possible to complete early warming up of an engine, as well as reduce friction and improve fuel economy.

BEST MODES FOR CARRYING OUT THE INVENTION

Hereinafter, best modes for carrying out the present invention will be described in detail with reference to the drawings.

First Embodiment

Figures 1A, 1B:
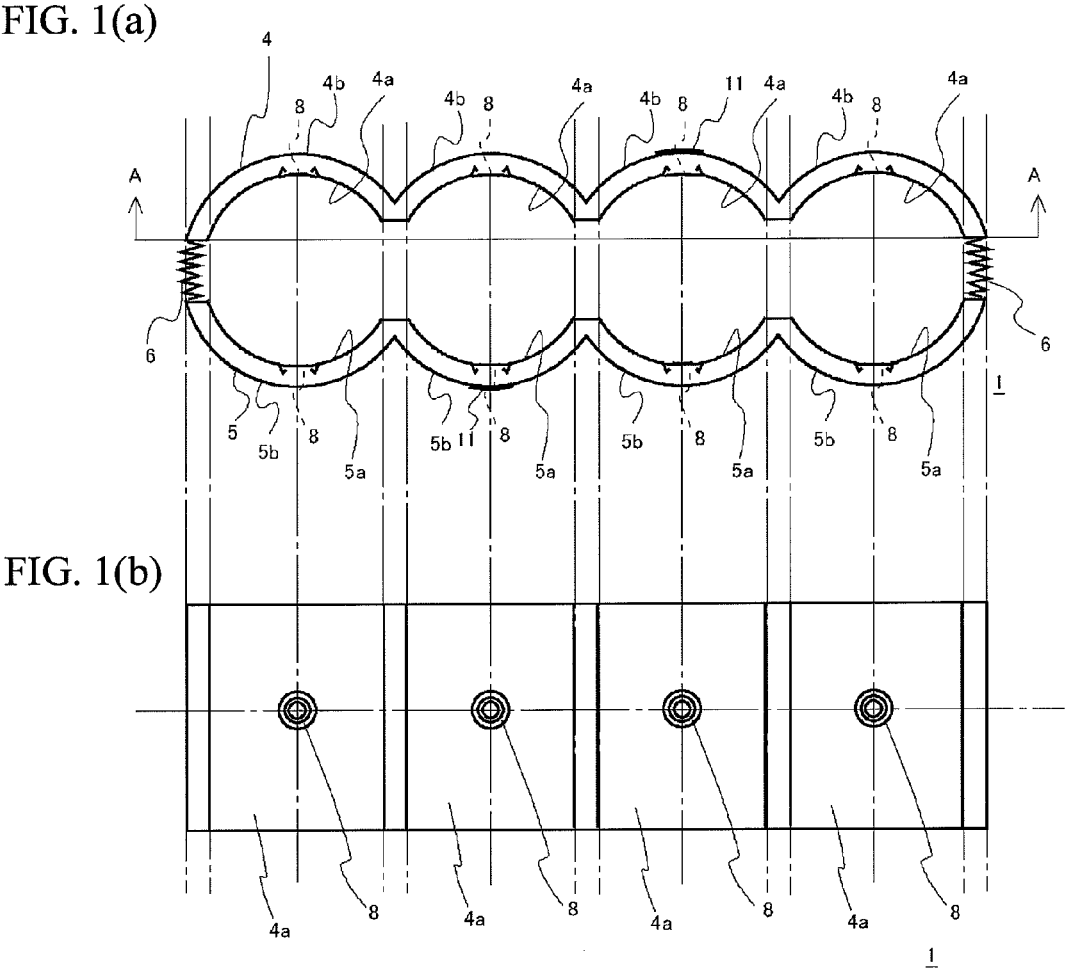
FIG. 1(a) is a plane view of a heat accumulator according to a first embodiment.
FIG. 1(b) is a cross-sectional view taken along a line A-A.
Figure 2A:
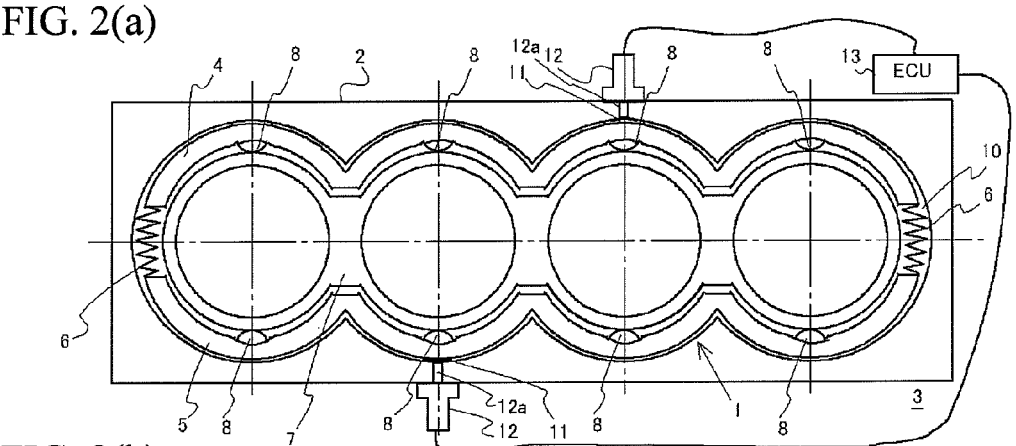
FIGS. 2(a) to (c) are all views showing the schematic structure of an engine incorporating the heat accumulator in a cylinder block, and views as seen from a cylinder head mounting side of the cylinder block with the cylinder head removed.
Figure 2B:
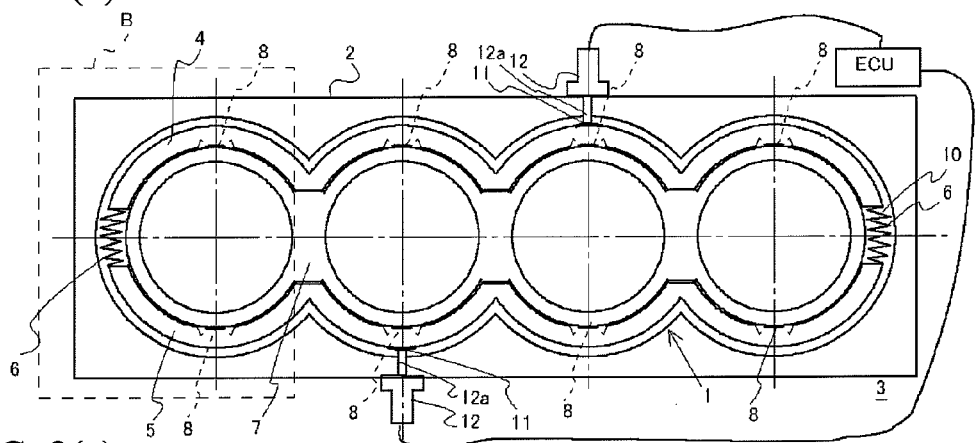
Figure 2C:
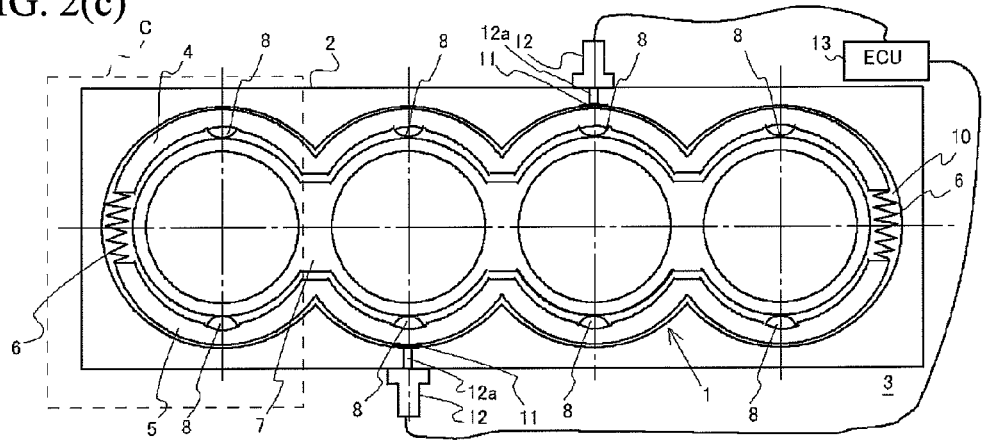
Figure 3:
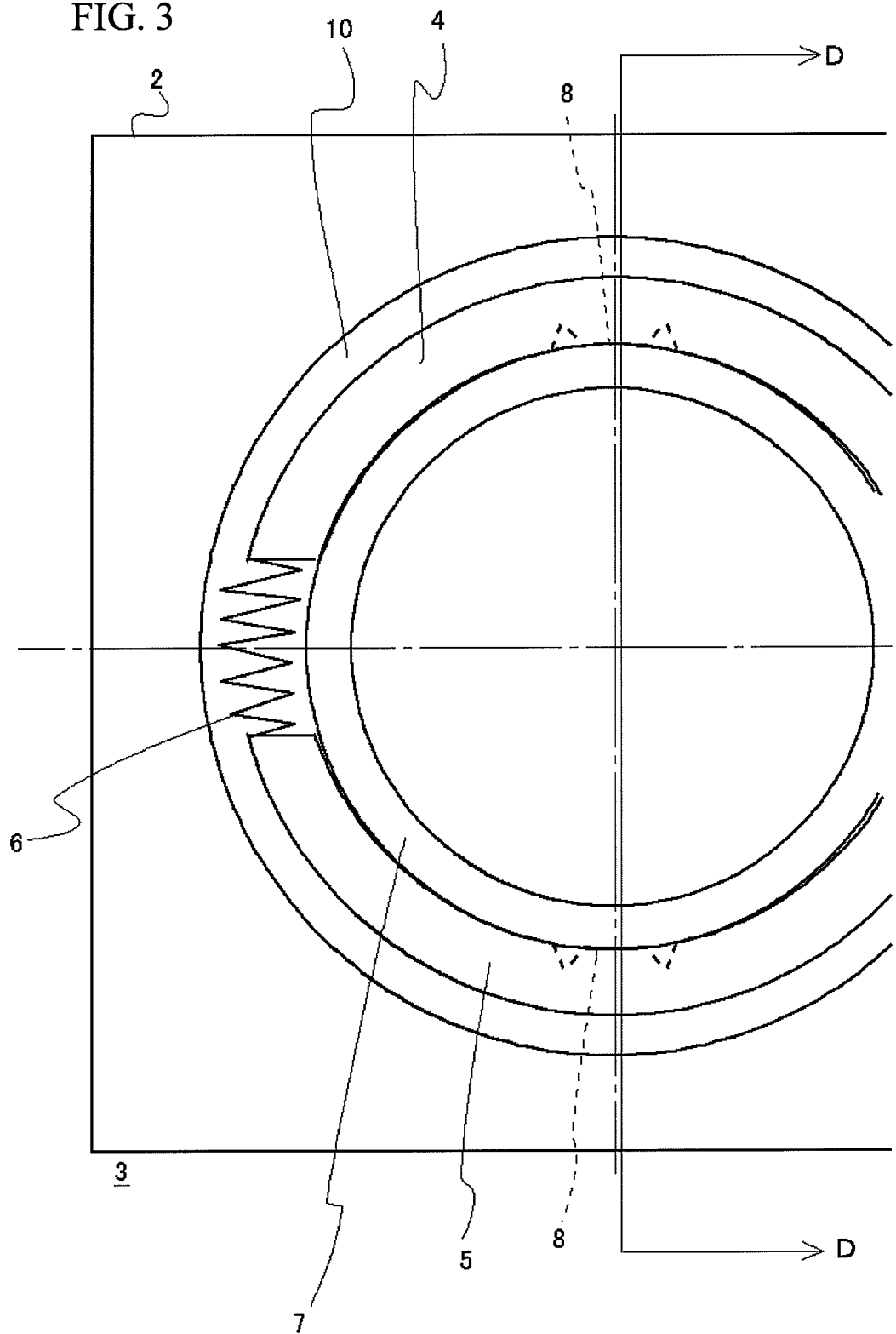
FIG. 3 is an expanded view showing a region B in FIG. 2(b) circled by a broken line.
Figure 4:
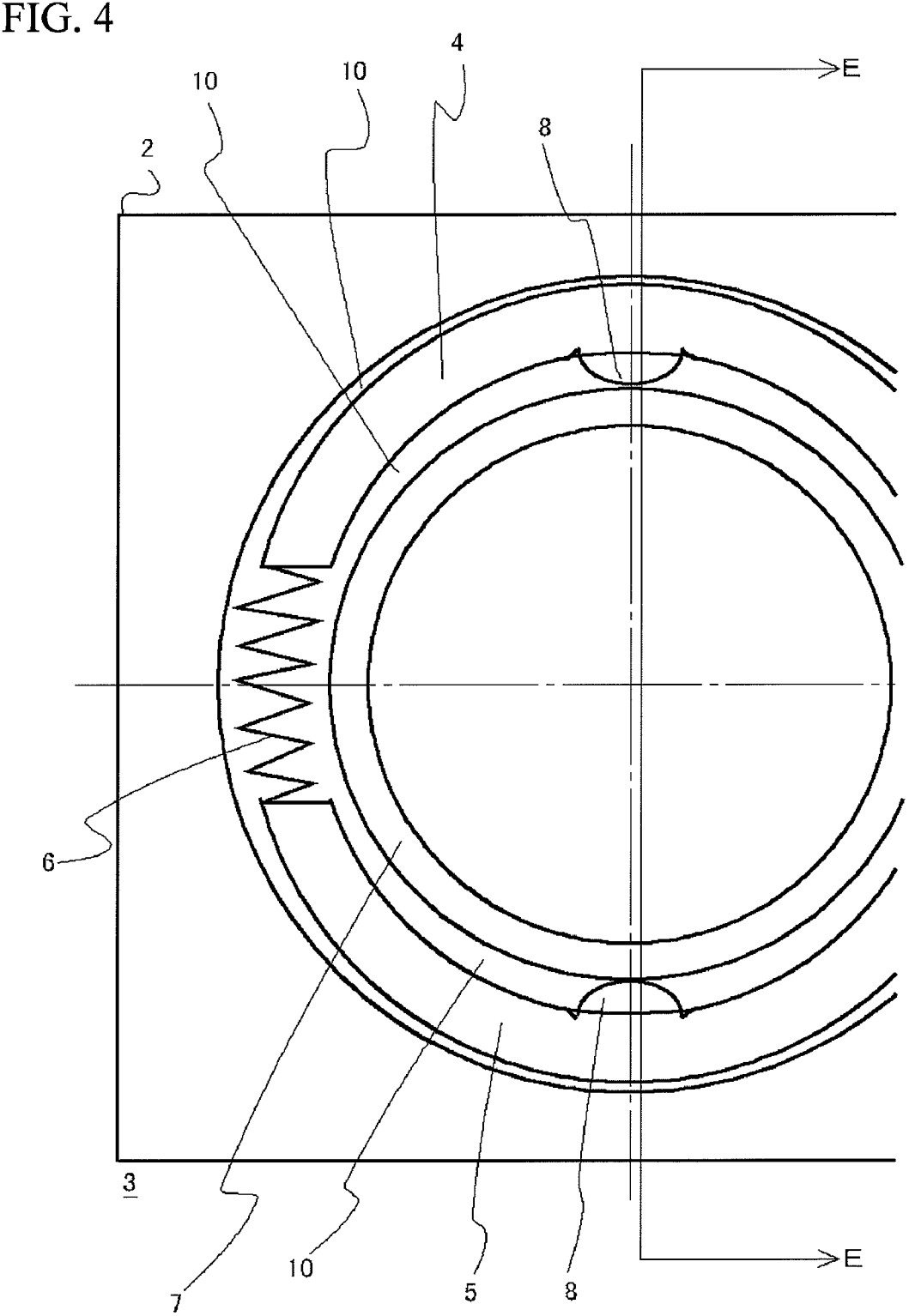
FIG. 4 is an expanded view showing a region C in FIG. 2(c) circled by a broken line.
Figure 5:
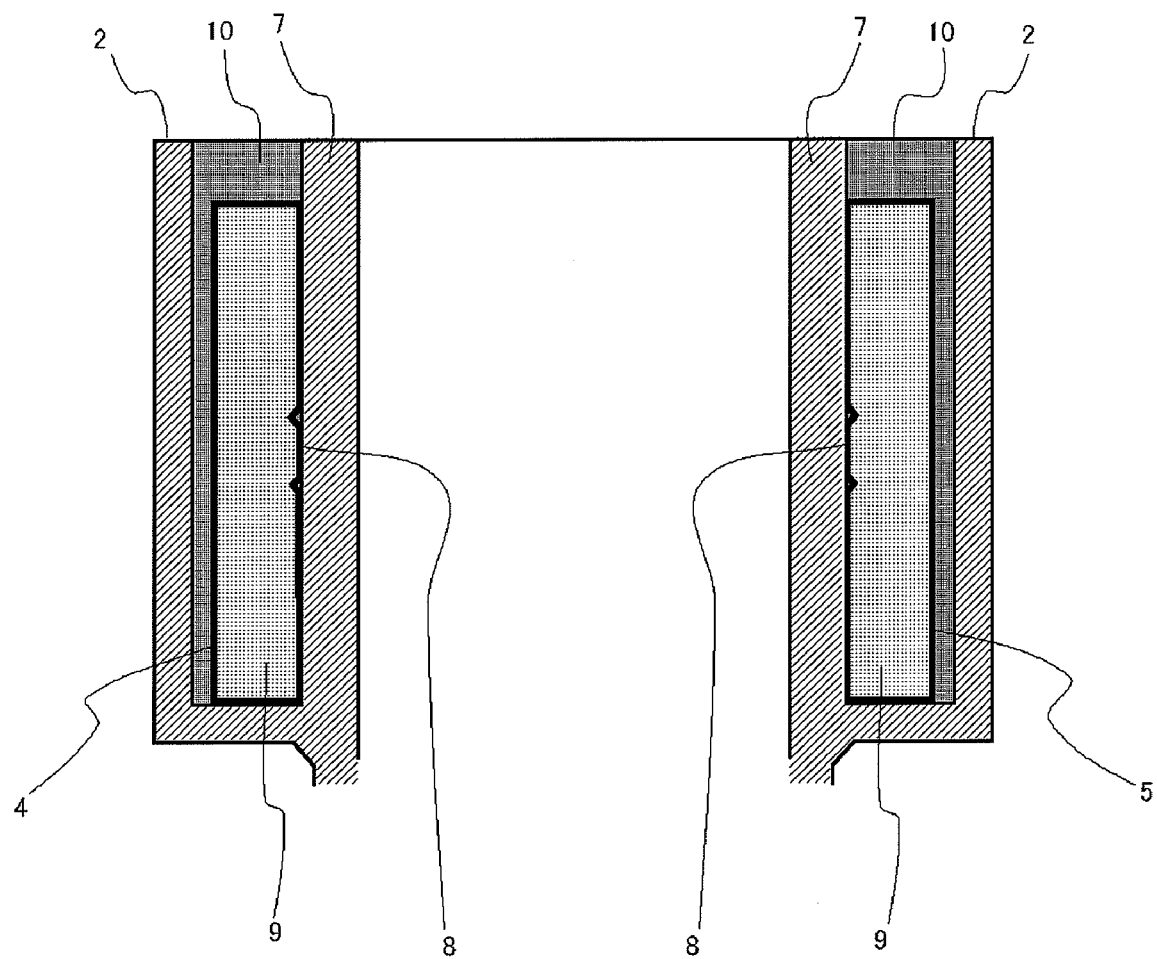
FIG. 5 is a cross-sectional view taken along a line D-D in FIG. 3.
Figure 6:
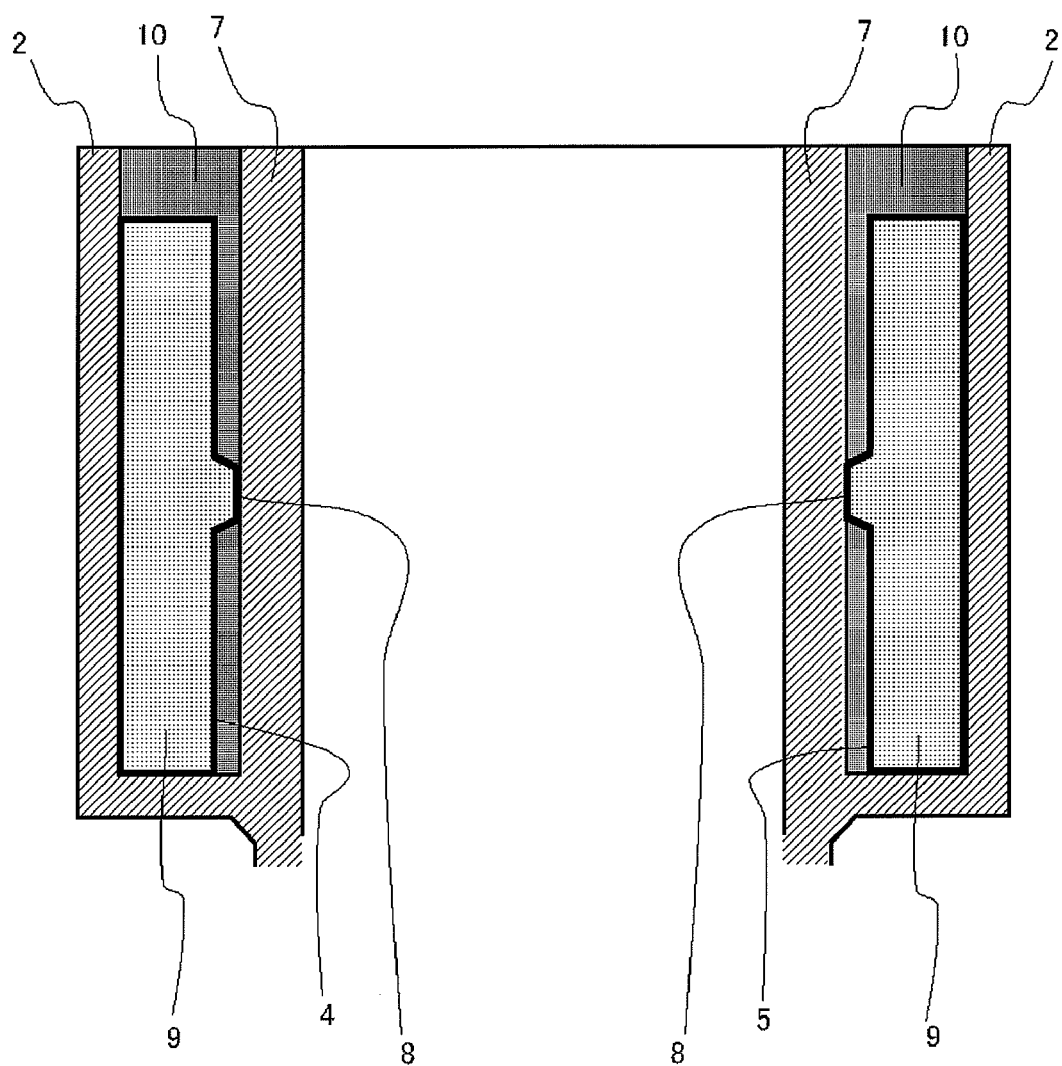
FIG. 6 is a cross-sectional view taken along a line E-E in FIG. 4.

FIG. 1(a) is a plane view of a heat accumulator 1 according to the present invention. FIG. 1(b) is a cross-sectional view taken along a line A-A in FIG. 1(a). FIGS. 2(a) to (c) are all views showing the schematic structure of an engine 3 incorporating the heat accumulator 1 in a cylinder block 2, and views as seen from a cylinder head mounting side of the cylinder block 2 with the cylinder head removed. FIGS. 2(a) to (c) show different states of the heat accumulator 1 during operation. FIG. 3 is an expanded view showing a region B in FIG. 2(b) circled by a broken line. FIG. 4 is an expanded view showing a region C in FIG. 2(c) circled by a broken line. FIG. 5 is a cross-sectional view taken along a line D-D in FIG. 3. FIG. 6 is a cross-sectional view taken along a line E-E in FIG. 4. Note that the engine 3 in the present embodiment is a four-cylinder engine.

As the figures show, the heat accumulator 1 is formed by connecting a first container 4 and a second container 5 via a spring 6 that corresponds to a connecting member of the present invention. The first container 4 is made of metal, and has a wall-shaped inner side wall 4a that corresponds to the shape of a cylinder bore wall 7. This inner side wall 4a is a wall that faces the cylinder bore wall 7. Provided on this inner side wall 4a is a flexible structural part 8. The flexible structural part 8 is formed of highly elastic resin. Therefore, although the metal first container 4 does not deform, the flexible structural part 8 deforms easily. The present invention has a structure that absorbs the content of the container, i.e., the volume increase of a heat storage medium 9 to be described later, by projecting of the flexible structural part 8 to the outer side. In addition, an outer side wall 4b of the first container 4 is attached with a core generating trigger 11 that is enclosed in an internal portion and provides the trigger for a change of phase of the excessively cooled heat storage medium 9. The core generating trigger 11 deforms as a result of applied external force and generates a change of phase of the heat storage medium 9 in the internal portion.

The second container 5 also has a structure similar to the first container 4. Namely, the second container 5 has a wall-shaped inner side wall 5a that corresponds to the shape of the cylinder bore wall 7, and the inner side wall 5a is provided with the flexible structural part 8. In addition, an outer side wall 5b is attached with the core generating trigger 11.

The heat storage medium 9 is enclosed in the first container 4 and the second container 5 as described above (see FIGS. 5 and 6). The heat storage medium 9 according to the present embodiment is sodium acetate trihydrate. Sodium acetate trihydrate has a melting point of approximately 58° C., and is capable of maintaining an excessively cooled state up to about −20° C. to −30° C. In addition, sodium acetate trihydrate increases in volume by approximately 10% due to a change of phase from a solid to a liquid. The enclosed amount of the heat storage medium 9 is an amount capable of pushing out the flexible structural part 8 in the liquid state, and is adjusted to an amount that does not push out the flexible structural part 8 when in the solid state with reduced volume.

The first container 4 and the second container 5 enclosed with such a heat storage medium 9 have respective end portions connected by the spring 6, and are attached to the cylinder block 2. The cylinder block 2 is formed with a water jacket 10 so to surround the cylinder bore wall 7. The water jacket 10 is disposed around the cylinder bore wall 7, which forms four cylinders as shown in FIGS. 2(*a*) to (*c*), and is shaped such that four rings are arranged in a continuous series. Depending on the spring 6, the first container 4 and the second container 5 also achieve a similar shape wherein four rings are arranged in a continuous series. In such case, the first container 4 and the second container 5 are incorporated inside the water jacket 10 so as to closely contact the cylinder bore wall 7 due to the attraction force of the spring 6. In other words, the spring 6 is capable of exhibiting an attraction force in its initial state.

Note that the spring 6 and the flexible structural part 8 in the present embodiment form clearance adjustment means in the present invention.

Attached to the cylinder block 2 is an actuator 12. The actuator 12 is connected to an ECU 13. The actuator 12 presses the core generating trigger 11 that is attached with the first container 4 and the second container 5. Thus, the core generating trigger 11 operates to initiate a change of phase of the excessively cooled heat storage medium 9 and start the release of latent heat.

The operation of the heat accumulator 1 structured as described above will be sequentially explained next. First, under cold start conditions, an ON signal of an ignition key (not shown) that starts the engine 3 is generated. When this happens, the ECU 13 outputs an operation command to the actuator 12 based on this ON signal. During the cold start, the heat storage medium 9 is excessively cold. Accordingly, the heat storage medium 9 changes to a liquid, and as shown in FIG. 2(*a*), the flexible structural part 8 projects toward the cylinder bore wall 7 side. Therefore, a clearance is formed between the cylinder bore wall 7 and the first and second containers 4 and 5. Once an electric current is run to the actuator 12 that received the operation command and a needle 12*a* is projected, the core generating trigger 11 becomes pressed by the needle 12*a*. Pressing of the core generating trigger 11 triggers the heat storage medium 9 within the first container 4 and the second container 5, and starts a change of phase. As the heat storage medium 9 starts to change to another phase, the release of accumulated latent heat begins.

The heat storage medium 9 decreases in volume when a change of phase accompanying the release of latent heat changes the heat storage medium 9 from a liquid to a solid. Therefore, the shape of the flexible structural part 8, as shown in FIGS. 2(*b*), 3 and 5, changes so as to become practically flush with the inner side walls 4*a* and 5*a*. With the respective inner side walls 4*a* and 5*a* flush with each other, the first container 4 and the second container 5 are drawn together by the spring 6 and come into close contact with the cylinder bore wall 7. Such a state continues until the temperature of coolant flowing within the water jacket 10 reaches approximately 58° C., which is the melting temperature of the heat storage medium 9. Thus, heat released from the heat storage medium 9 is efficiently transferred to the cylinder bore wall 7, which is in close contact with the first container 4 and the second container 5. As a consequence, early warming up of the engine 3 can be achieved.

Once the engine 3 is started, combustion heat and the like from the engine 3 begin to generate. Such heat self-generated by the engine 3 also contributes to the warm-up. Furthermore, such heat is also transferred to the cylinder bore wall 7 through circulating engine oil and the like. The temperature of coolant flowing within the water jacket 10 rises as well.

In this manner, the temperature of the coolant rises as the warming up of the engine 3 progresses. When the coolant temperature of the engine 3 reaches the melting temperature of the heat storage medium 9, the heat storage medium 9 dissolves and starts a change of phase from a solid to a liquid. The heat storage medium 9 at this stage is in a state that absorbs surrounding heat. To improve fuel consumption on the basis of an early warm-up, early raising of the temperature of the cylinder bore wall 7 against which a piston (not shown) slides to reduce piston friction is effective. Therefore, if the first container 4 and the second container 5 are still in close contact with the cylinder bore wall 7, the heat storage medium 9 may steal heat from the cylinder bore wall 7 and reduce the warming up effect.

However, the heat accumulator 1 according to the present embodiment manages to avoid the problem of the heat storage medium 9 stealing heat from the cylinder bore wall 7 through the operation described below.

The heat storage medium 9 absorbs heat from the surrounding coolant and the like, and the volume of the heat storage medium 9 increases due to a change of phase from a solid to a liquid. Therefore, the melted liquid heat storage medium 9 again projects the flexible structural part 8 outward. Thus, the first container 4 and the second container 5, as shown in FIGS. 2(*c*), 4 and 6, are again separated from the cylinder bore wall 7. As a consequence, it is possible to avoid heat such as combustion heat self-generated by the engine 3 being stolen due to the heat absorption effect of the heat storage medium 9.

In addition, coolant flows between the first container 4 and the second container 5 due to their separation from the cylinder bore wall 7, as shown in FIGS. 2(*c*), 4 and 6. Therefore, it is possible to both complete warming up and achieve cooling of the engine 3 operating under strict thermal conditions. In other words, although an early increase in the temperature of the cylinder bore wall 7 is needed during a cold start, after warming up is completed, appropriate cooling then becomes required. With the heat accumulator 1 of the present embodiment, these requirements can be met.

Thus, the heat storage medium 9 that stole heat from the engine 3 after the completion of warming up remains a liquid with a lowered temperature once the engine 3 stops and cools. That is, the heat storage medium 9 accumulates the heat stolen from the engine 3 and becomes excessively cooled again in preparation for the next engine start-up.

Second Embodiment

Figure 7:
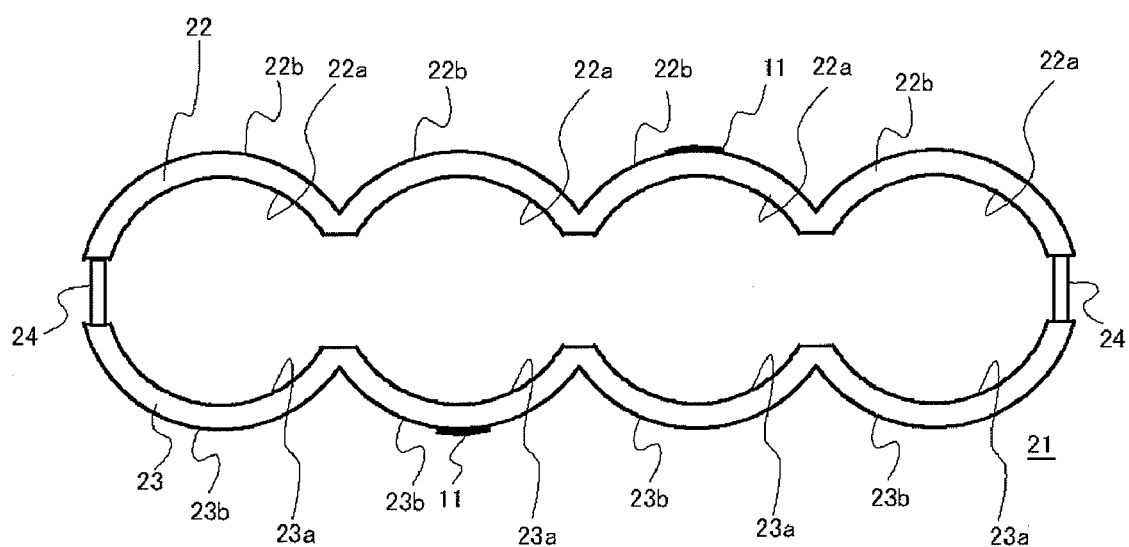
FIG. 7 is a plane view of a heat accumulator according to a second embodiment.
Figure 8A:
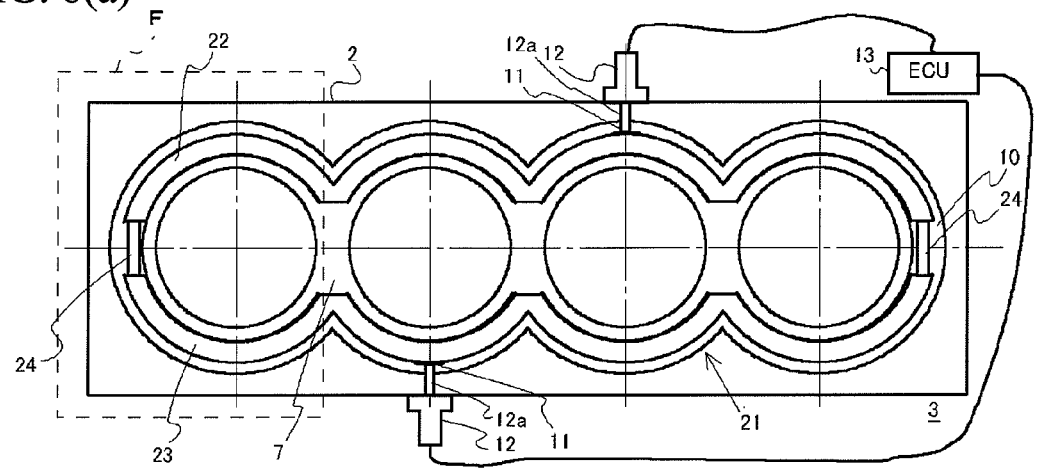
FIGS. 8(a) and (b) are both views showing the schematic structure of an engine incorporating the heat accumulator in a cylinder block, and views as seen from a cylinder head mounting side of the cylinder block with the cylinder head removed.
Figure 8B:
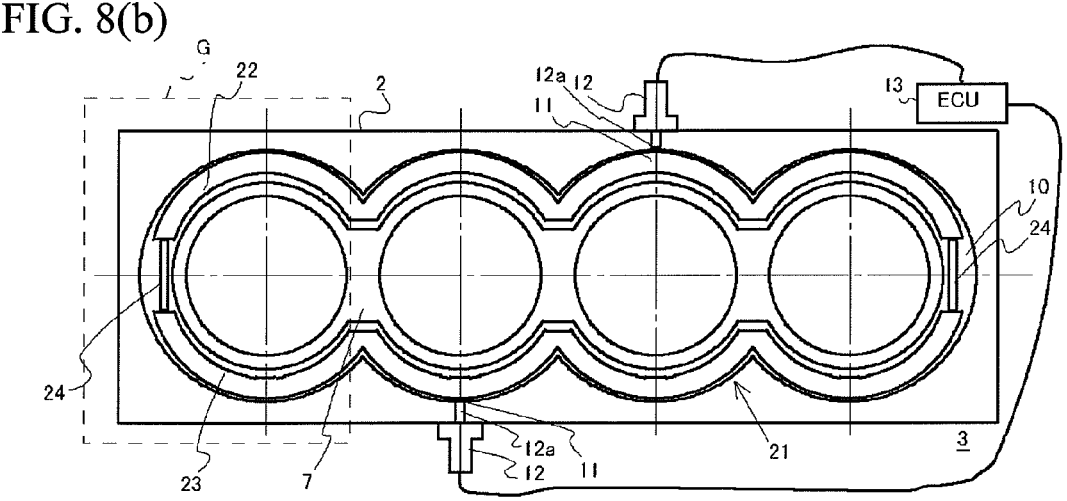
Figure 9:
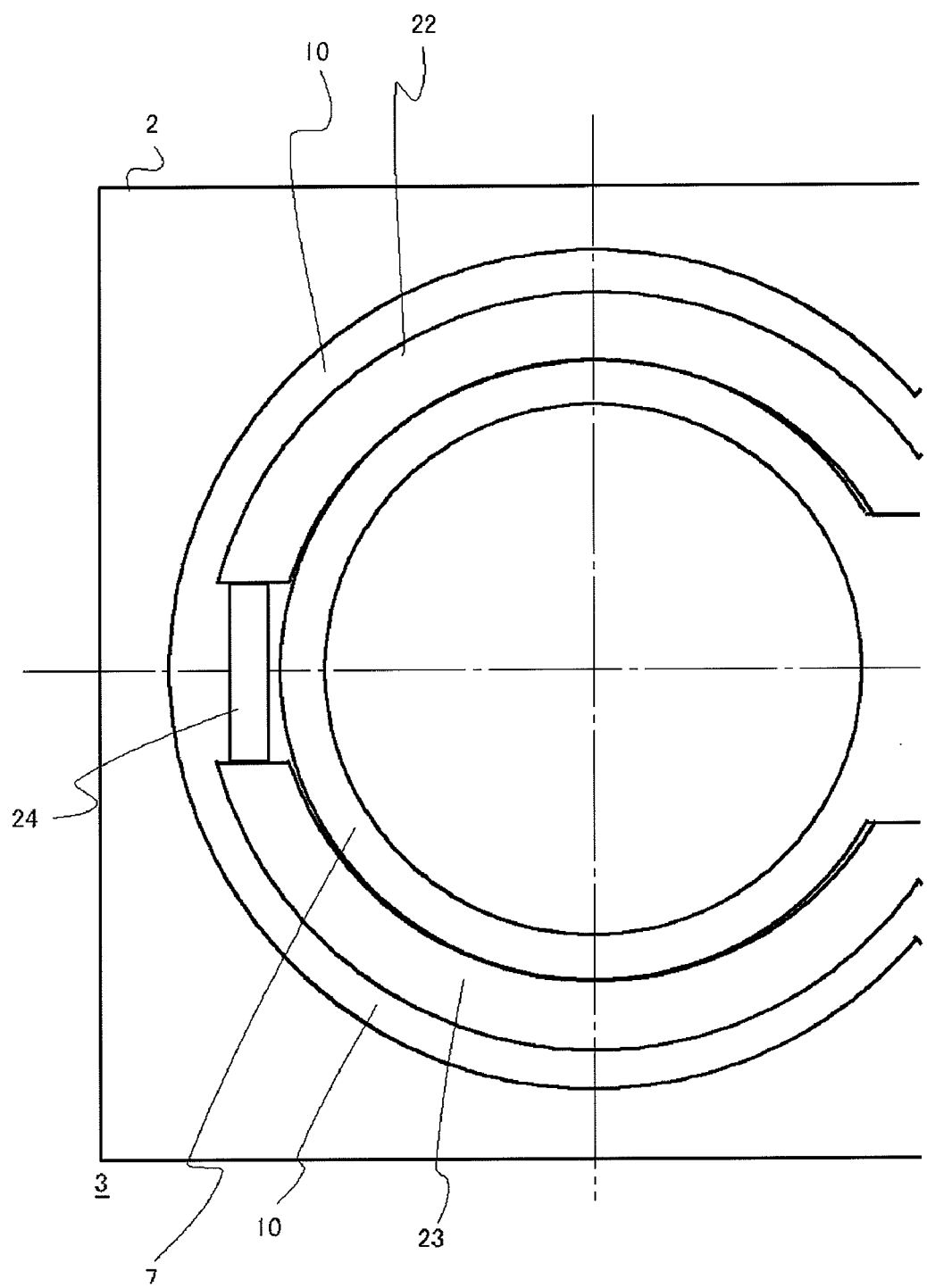
FIG. 9 is an expanded view showing a region F in FIG. 8(a) circled by a broken line.
Figure 10:
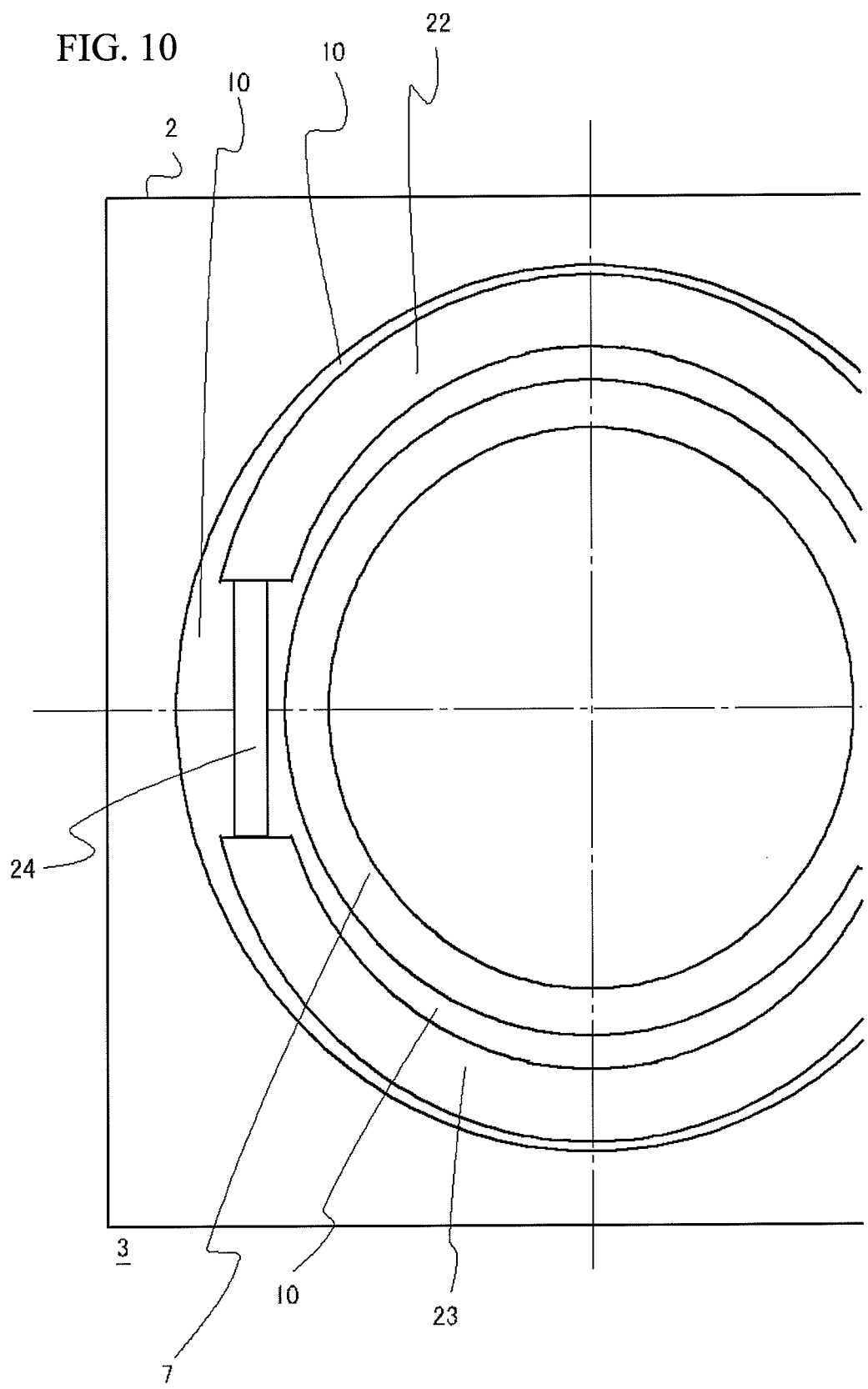
FIG. 10 is an expanded view showing a region G in FIG. 8(b) circled by a broken line.

A second embodiment will be described next with reference to FIGS. 7 to 10. FIG. 7 is a plane view of a heat accumulator 21 according to the second embodiment. FIGS. 8(*a*) and (*b*) are both views showing the schematic structure of the engine 3 incorporating the heat accumulator 21 in the cylinder block 2, and views as seen from a cylinder head mounting side of the cylinder block 2 with the cylinder head removed. FIGS. 8(*a*) and (*b*) show different states of the heat accumulator 21 during operation. FIG. 9 is an expanded view showing a region F in FIG. 8(*a*) circled by a broken line. FIG. 10 is an expanded view showing a region G in FIG. 8(*b*) circled by a broken line. Note that the engine 3 in the present embodiment is a four-cylinder engine, and along with the cylinder block 2, is identical to the engine 3 in the first embodiment.

As the figures show, the heat accumulator 21 is formed by connecting a first container 22 and a second container 23 via a connecting member 24, which is formed from a shape-memory metal that corresponds to an expansion-contraction mechanism of the present invention. The first container 22 is made of metal, and has a wall-shaped inner side wall 22*a* that corresponds to the shape of a cylinder bore wall 7. This inner side wall 22*a* is a wall that faces the cylinder bore wall 7. In addition, an outer side wall 22*b* of the first container 22 is attached with a core generating trigger 11 that is enclosed in an internal portion and provides the trigger for a change of phase of the excessively cooled heat storage medium 9. The core generating trigger 11 deforms as a result of applied external force and generates a change of phase of the heat storage medium 9 in the internal portion. The first container 22 is identical to the first container 4 of the first embodiment with regard to the above points. However, unlike the first container 4 of the first embodiment, the flexible structural part 8 is not provided.

The second container 23 also has a structure similar to the first container 4. Namely, the second container 23 has a wall-shaped inner side wall 23*a* that corresponds to the shape of the cylinder bore wall 7. In addition, an outer side wall 23*b* is attached with the core generating trigger 11.

The heat storage medium 9 is enclosed in the first container 22 and the second container 23 as described above. The heat storage medium 9 according to the present embodiment is sodium acetate trihydrate. This point is identical to the first container 4 and the second container 5 of the first embodiment.

The first container 22 and the second container 23 have respective end portions connected by the connecting member 24, and are attached to the cylinder block 2. The connecting member 24 is formed from shape-memory metal and has a plate shape. The characteristics of shape-memory metal are such that an increase in temperature increases the length of the shape-memory metal. Therefore, the length of the connecting member 24 is set having an initial state that is based on the temperature during a cold start. When the first container 22 and the second container 23 are incorporated into the water jacket 10, the length of the connecting member 24 in this initial state is a length that allows the first container 22 and the second container 23 to closely contact the cylinder bore wall 7, as shown in FIGS. 8(*a*) and 9. Until the melting temperature of the heat storage medium 9 is reached, the length of the connecting member 24 is held nearly identical to the length of the initial state. Thus, it is possible to maintain the first container 22 and the second container 23 in a state of close contact with the cylinder bore wall 7. In addition, the length of the connecting member 24 gradually increases when left in an environment that exceeds the melting temperature of the heat storage medium 9, causing the first container 22 and the second container 23 to separate from the cylinder bore wall 7.

Note that the actuator 12 attached to the cylinder block 2 and the ECU 13 connected to the actuator 12 are identical to those of the first embodiment.

The operation of the heat accumulator 21 structured as described above will be sequentially explained next. First, under cold start conditions, an ON signal of an ignition key (not shown) that starts the engine 3 is generated. When this happens, the ECU 13 outputs an operation command to the actuator 12 based on this ON signal. During the cold start, the heat storage medium 9 is excessively cold. In addition, the connecting member 24 maintains the length of its initial state so that the first container 22 and the second container 23 closely contact the cylinder bore wall 7, as shown in FIGS. 8(*a*) and 9. Once an electric current is run to the actuator 12 that received the operation command and a needle 12*a* is projected, the core generating trigger 11 becomes pressed by the needle 12*a*. Pressing of the core generating trigger 11 triggers the heat storage medium 9 within the first container 22 and the second container 23, and starts a change of phase. As the heat storage medium 9 starts to change to another phase, the release of accumulated latent heat begins.

The above-described state continues until the temperature of the coolant flowing within the water jacket 10 reaches approximately 58° C., that is, the melting temperature of the heat storage medium 9. Thus, heat released from the heat storage medium 9 is efficiently transferred to the cylinder bore wall 7, which is in close contact with the first container 22 and the second container 23. As a consequence, early warming up of the engine 3 can be achieved.

Once the engine 3 is started, combustion heat and the like from the engine 3 begin to generate. Such heat self-generated by the engine 3 also contributes to the warm-up. Furthermore, such heat is also transferred to the cylinder bore wall 7 through circulating engine oil and the like. The temperature of coolant flowing within the water jacket 10 rises as well.

In this manner, the temperature of the coolant rises as the warming up of the engine 3 progresses. When the coolant temperature of the engine 3 reaches the melting temperature of the heat storage medium 9, the heat storage medium 9 dissolves and starts a change of phase from a solid to a liquid. The heat storage medium 9 at this stage is in a state that absorbs surrounding heat. As mentioned in the description of the first embodiment, to improve fuel consumption on the basis of an early warm-up, early raising of the temperature of the cylinder wall 7 against which a piston (not shown) slides to reduce piston friction is effective. Therefore, if the first container 22 and the second container 23 are still in close contact with the cylinder bore wall 7, the heat storage medium 9 may steal heat from the cylinder bore wall 7 and reduce the warming up effect.

However, the heat accumulator 21 according to the present embodiment manages to avoid the problem of the heat storage medium 9 stealing heat from the cylinder bore wall 7 through the operation described below.

Due to heat released by the heat storage medium 9 and combustion heat and the like from the engine 3, an increase in the coolant temperature is accompanied by an increase in the length of the connecting member 24. Thus, the first container 22 and the second container 23 transition from a state of close contact with the cylinder bore wall 7, as shown in FIGS. 8(*a*) and 9, to a state of separation from the cylinder bore wall 7, as shown in FIGS. 8(*b*) and 10. As a consequence, it is possible to avoid heat such as combustion heat self-generated by the engine 3 being stolen due to the heat absorption effect of the heat storage medium 9.

In addition, coolant flows between the first container 22 and the second container 23 due to their separation from the cylinder bore wall 7, as shown in FIGS. 8(*b*) and 10. Therefore, it is possible to both complete warming up and achieve cooling of the engine 3 operating under strict thermal conditions. In other words, although an early increase in the temperature of the cylinder bore wall 7 is needed during a cold start, after warming up is completed, appropriate cooling then becomes required. With the heat accumulator 21 of the present embodiment, these requirements can be met the same as in the first embodiment.

Thus, the heat storage medium 9 that stole heat from the engine 3 after the completion of warming up remains a liquid with a lowered temperature once the engine 3 stops and cools. That is, the heat storage medium 9 accumulates the heat stolen from the engine 3 and becomes excessively cooled again in preparation for the next engine start-up. The second embodiment is identical to the case of the first embodiment regarding this point.

Third Embodiment

Figure 11:
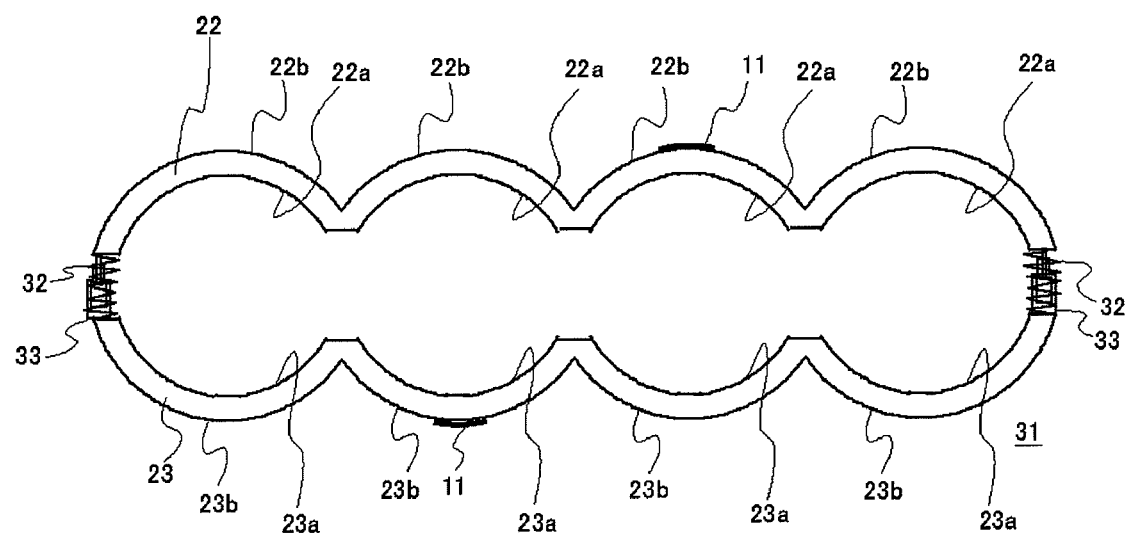
FIG. 11 is a plane view of a heat accumulator according to a third embodiment.
Figure 12A:
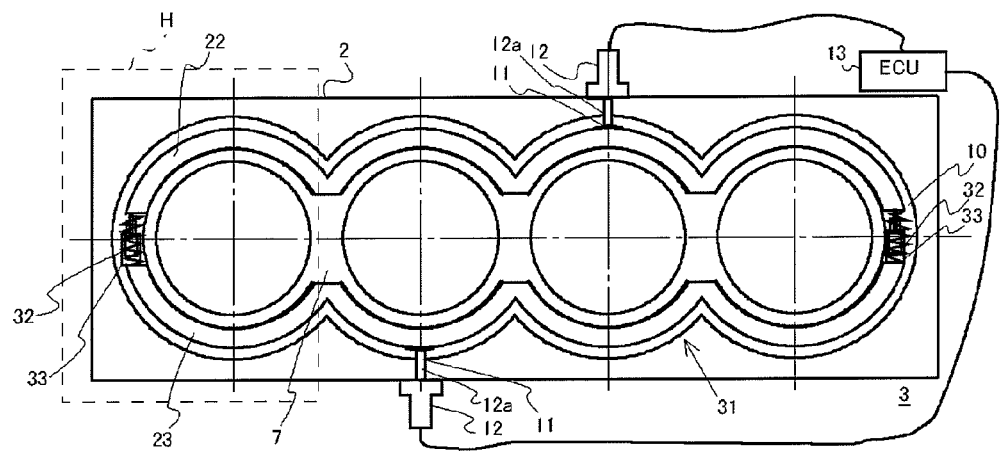
FIGS. 12(a) and (b) are both views showing the schematic structure of an engine incorporating the heat accumulator in a cylinder block, and views as seen from a cylinder head mounting side of the cylinder block with the cylinder head removed.
Figure 12B:
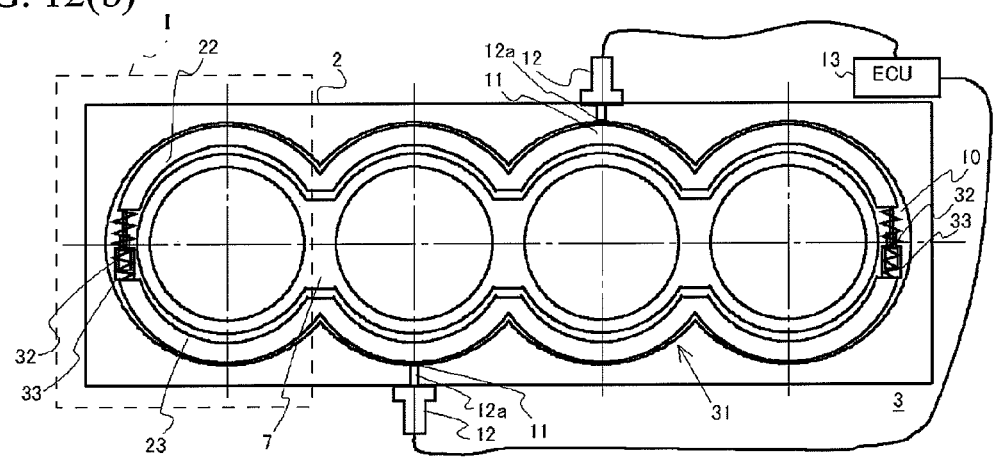
Figure 13:
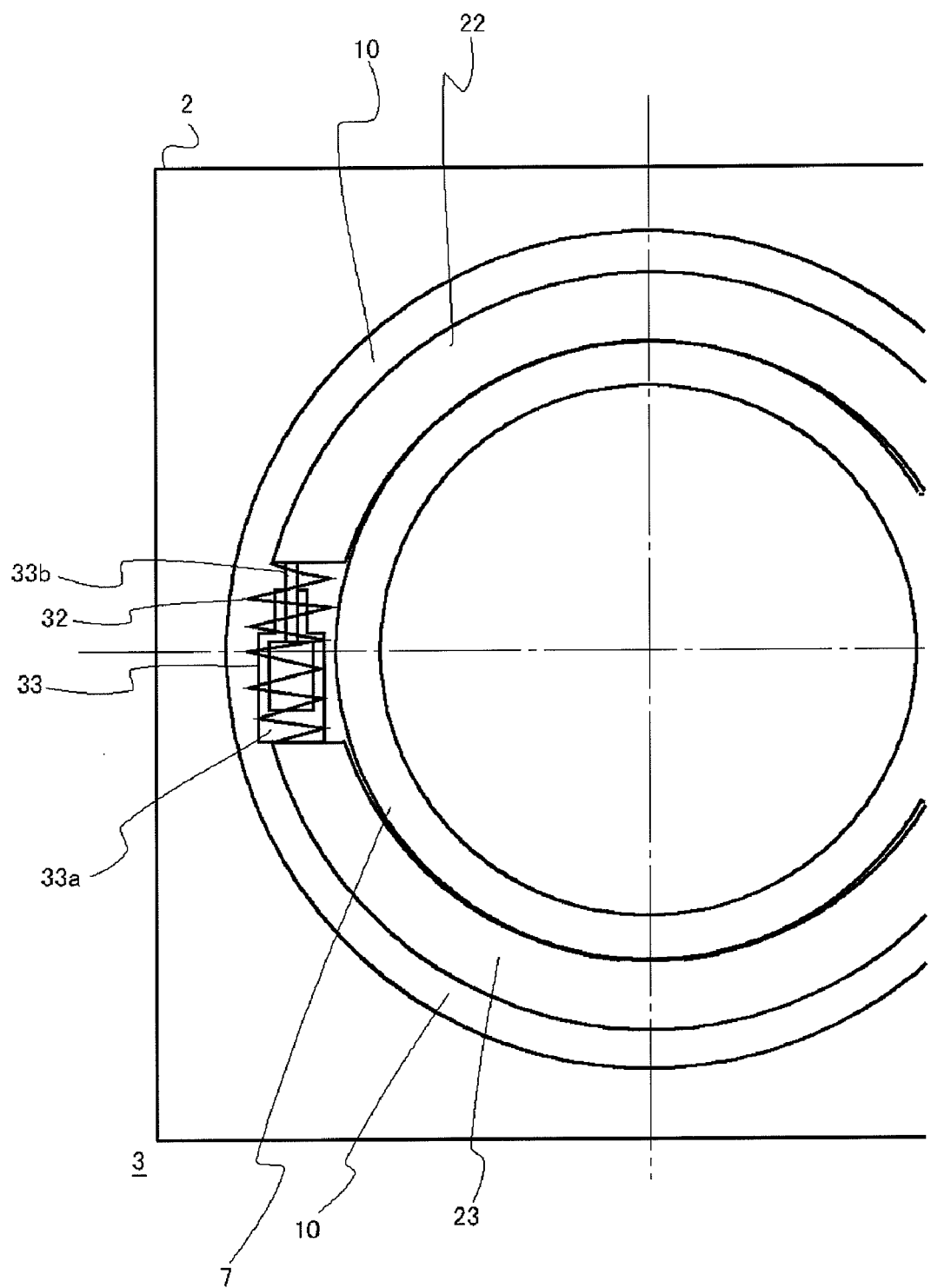
FIG. 13 is an expanded view showing a region H in FIG. 12(a) circled by a broken line.
Figure 14:
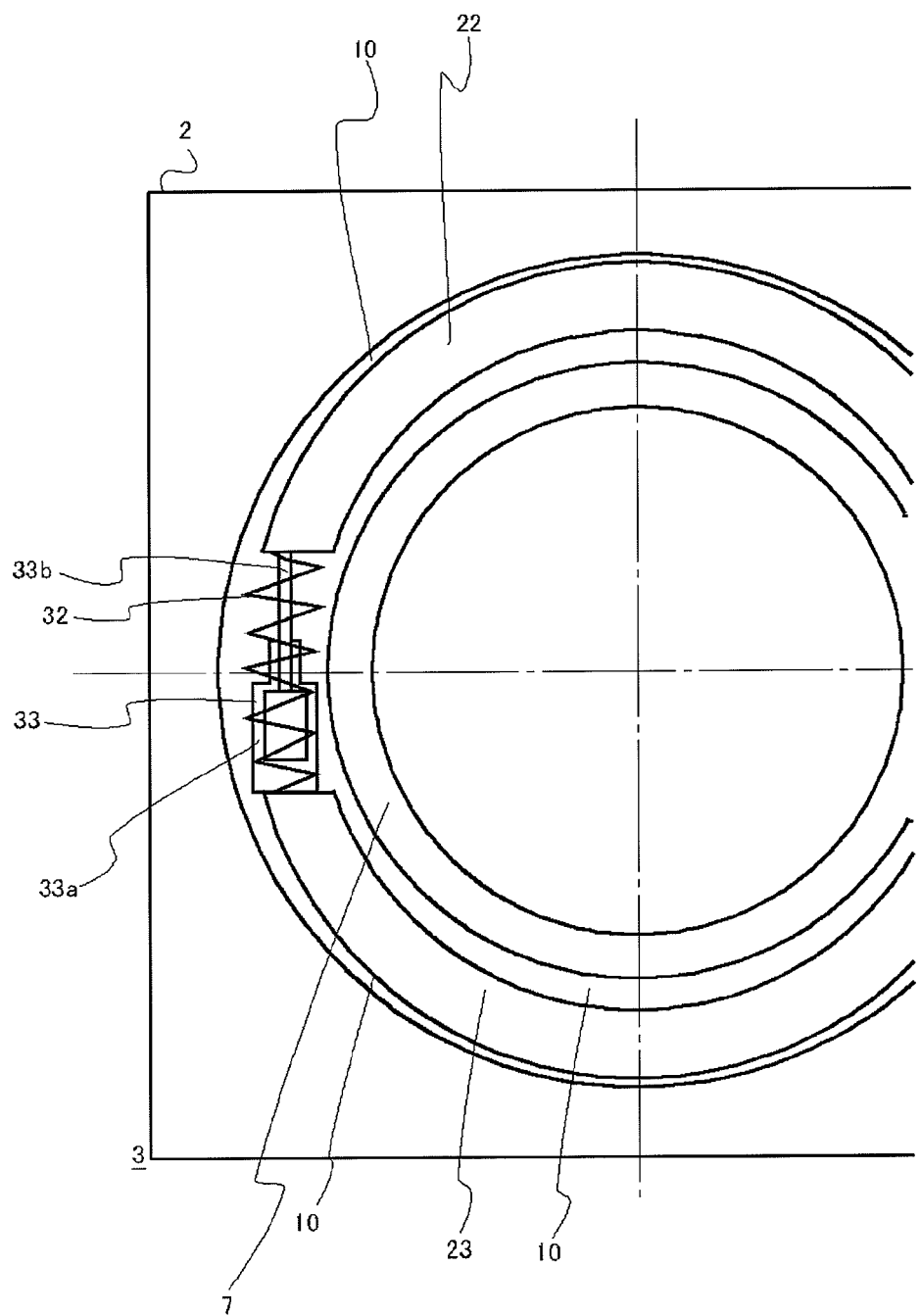
FIG. 14 is an expanded view showing a region I in FIG. 12(b) circled by a broken line.

A third embodiment will be described next with reference to FIGS. 11 to 14. FIG. 11 is a plane view of a heat accumulator 31 according to the third embodiment. FIGS. 12(a) and (b) are both views showing the schematic structure of the engine 3 incorporating the heat accumulator 31 in the cylinder block 2, and views as seen from a cylinder head mounting side of the cylinder block 2 with the cylinder head removed. FIGS. 12(a) and (b) show different states of the heat accumulator 31 during operation. FIG. 13 is an expanded view showing a region H in FIG. 12(a) circled by a broken line. FIG. 14 is an expanded view showing a region I in FIG. 12(b) circled by a broken line. Note that the engine 3 in the present embodiment is a four-cylinder engine, and along with the cylinder block 2, is identical to the engine 3 in the first and second embodiments.

As the figures show, the heat accumulator 31 is formed by connecting the first container 22 and the second container 23 via a spring 32 and a thermostat 33, which correspond to the clearance adjustment means of the present invention. The first container 22 and the second container 23 employ the same structure as used in the second embodiment. The third embodiment is also identical to the second embodiment on the point of enclosing the heat storage medium 9 in an internal portion. Therefore, like reference numerals are assigned to like structural components, and descriptions for these are omitted.

The spring 32, similar to the spring 6 of the first embodiment, is capable of exhibiting an attraction force in its initial state. Due to this attraction force, the first container 22 and the second container 23 are incorporated inside the water jacket 10 so as to closely contact the cylinder bore wall 7. The thermostat 33 is equipped with a temperature sensor 33a and a piston 33b. The internal portion of the temperature sensor 33a encloses wax. The expansion of such wax due to heat pushes out the piston 33b so as to change the overall length of the thermostat 33. Such a thermostat 33 is shorter at cold start, and becomes longer once the coolant temperature exceeds the melting temperature of the heat storage medium 9 and the piston 33b is pushed out. By becoming longer, the thermostat 33 causes the first container 22 and the second container 23 to separate from the cylinder bore wall 7.

Note that the actuator 12 attached to the cylinder block 2 and the ECU 13 connected to the actuator 12 are identical to those of the first and second embodiments.

The operation of the heat accumulator 31 structured as described above will be sequentially explained next. First, under cold start conditions, an ON signal of an ignition key (not shown) that starts the engine 3 is generated. When this happens, the ECU 13 outputs an operation command to the actuator 12 based on this ON signal. During the cold start, the heat storage medium 9 is excessively cold. In addition, the thermostat 33 is shorter and the first container 22 and the second container 23 are attracted by the spring 32 so as to closely contact the cylinder bore wall 7, as shown in FIGS. 12(a) and 13. Once an electric current is run to the actuator 12 that received the operation command and a needle 12a is projected, the core generating trigger 11 becomes pressed by the needle 12a. Pressing of the core generating trigger 11 triggers the heat storage medium 9 within the first container 22 and the second container 23, and starts a change of phase.

As the heat storage medium 9 starts to change to another phase, the release of accumulated latent heat begins.

The above-described state continues until the temperature of the coolant flowing within the water jacket 10 reaches approximately 58° C., that is, the melting temperature of the heat storage medium 9. Thus, heat released from the heat storage medium 9 is efficiently transferred to the cylinder bore wall 7, which is in close contact with the first container 22 and the second container 23. As a consequence, early warming up of the engine 3 can be achieved.

Once the engine 3 is started, combustion heat and the like from the engine 3 begin to generate. Such heat self-generated by the engine 3 also contributes to the warm-up. Furthermore, such heat is also transferred to the cylinder bore wall 7 through circulating engine oil and the like. The temperature of coolant flowing within the water jacket 10 rises as well.

In this manner, the temperature of the coolant rises as the warming up of the engine 3 progresses. When the coolant temperature of the engine 3 reaches the melting temperature of the heat storage medium 9, the heat storage medium 9 dissolves and starts a change of phase from a solid to a liquid. The heat storage medium 9 at this stage is in a state that absorbs surrounding heat. As mentioned in the description of the first embodiment, to improve fuel consumption on the basis of an early warm-up, early raising of the temperature of the cylinder wall 7 against which a piston (not shown) slides to reduce piston friction is effective. Therefore, if the first container 22 and the second container 23 are still in close contact with the cylinder bore wall 7, the heat storage medium 9 may steal heat from the cylinder bore wall 7 and reduce the warming up effect.

However, the heat accumulator 31 according to the present embodiment manages to avoid the problem of the heat storage medium 9 stealing heat from the cylinder bore wall 7 through the operation described below.

Due to heat released by the heat storage medium 9 and combustion heat and the like from the engine 3, an increase in the coolant temperature results in pushing out the piston 33b of the thermostat 33 and increasing the length of the thermostat 33. Thus, the first container 22 and the second container 23 transition from a state of close contact with the cylinder bore wall 7, as shown in FIGS. 12(a) and 13, to a state of separation from the cylinder bore wall 7, as shown in FIGS. 12(b) and 14. As a consequence, it is possible to avoid heat such as combustion heat self-generated by the engine 3 being stolen due to the heat absorption effect of the heat storage medium 9.

In addition, coolant flows between the first container 22 and the second container 23 due to their separation from the cylinder bore wall 7, as shown in FIGS. 12(b) and 14. Therefore, it is possible to both complete warming up and achieve cooling of the engine 3 operating under strict thermal conditions. In other words, although an early increase in the temperature of the cylinder bore wall 7 is needed during a cold start, after warming up is completed, appropriate cooling then becomes required. With the heat accumulator 31 of the present embodiment, these requirements can be met the same as in the first and second embodiments.

Thus, the heat storage medium 9 that stole heat from the engine 3 after the completion of warming up remains a liquid with a lowered temperature once the engine 3 stops and cools. That is, the heat storage medium 9 accumulates the heat stolen from the engine 3 and becomes excessively cooled again in preparation for the next engine start-up. The third embodiment is identical to the cases of the first and second embodiments regarding this point.

Fourth Embodiment

Figure 15A:
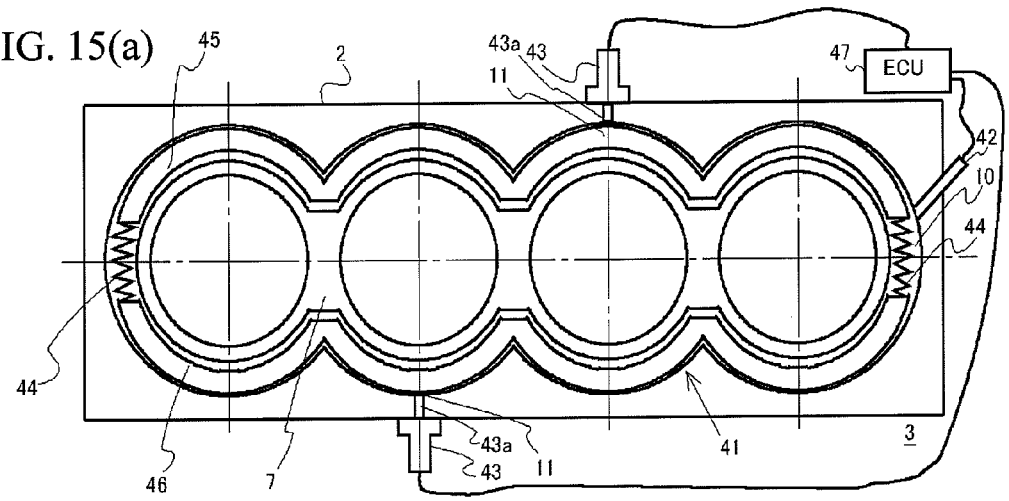
FIGS. 15(a) to (c) are all views showing the schematic structure of an engine incorporating a heat accumulator according to a fourth embodiment in a cylinder block, and views as seen from a cylinder head mounting side of the cylinder block with the cylinder head removed.
Figure 15B:
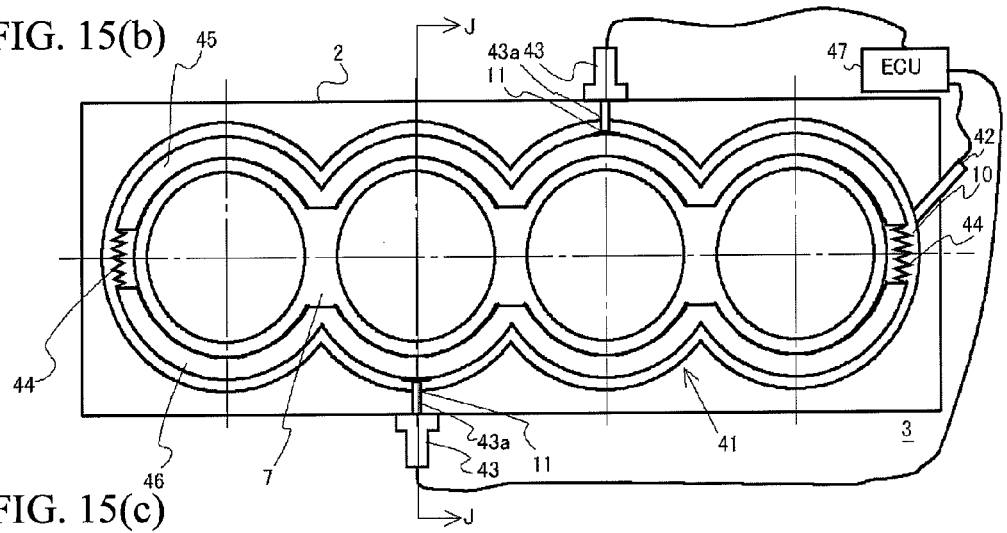
Figure 15C:
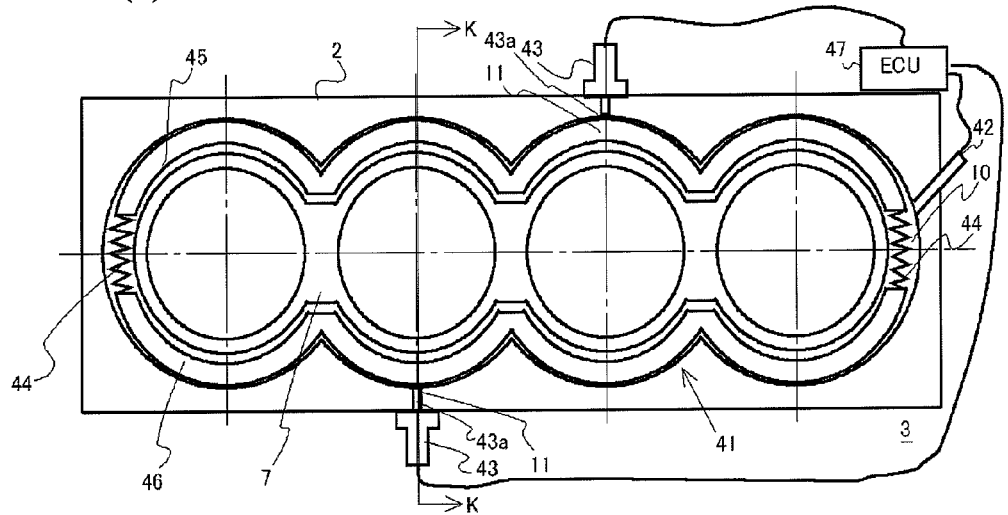
Figure 16:
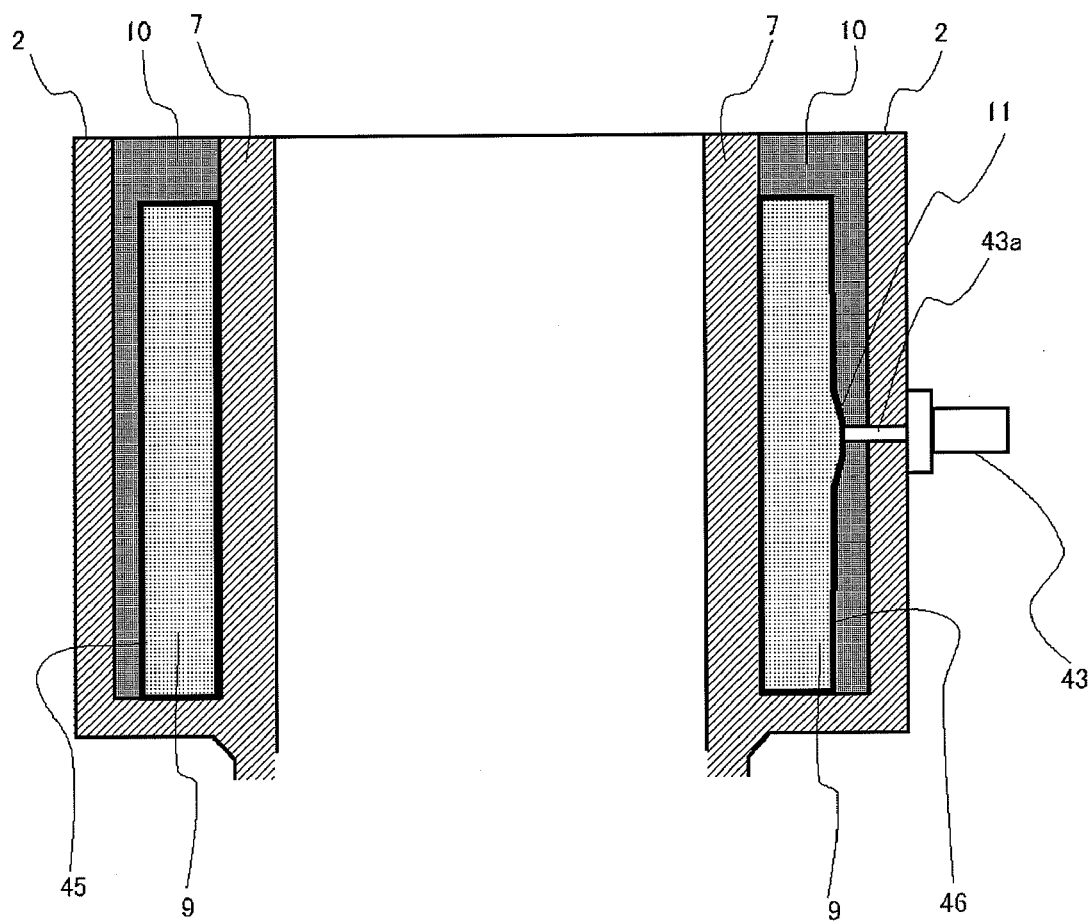
FIG. 16 is an expanded cross-sectional view taken along a line J-J in FIG. 15.
Figure 17:
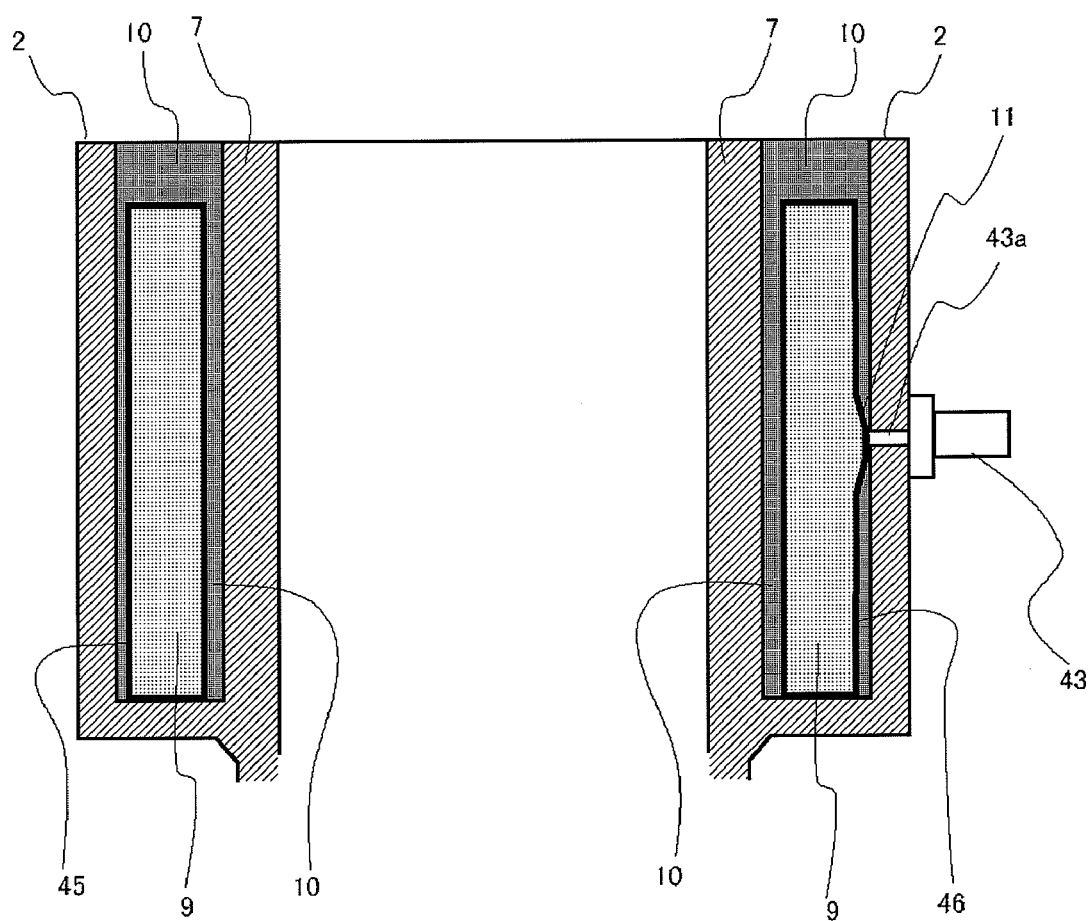
FIG. 17 is an expanded cross-sectional view taken along a line K-K in FIG. 15.
Figure 18:
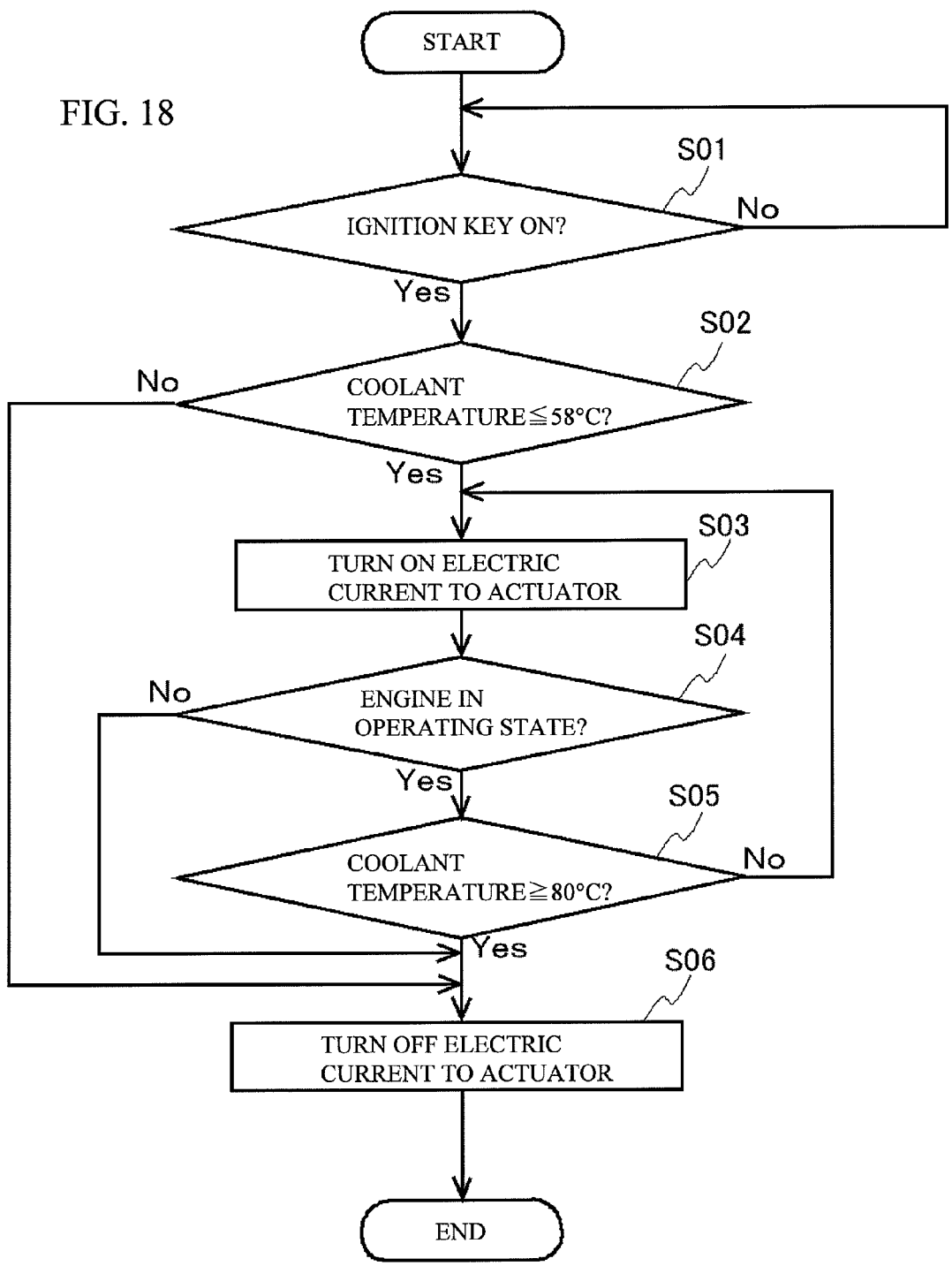
FIG. 18 is a flowchart showing an example of a control for the heat accumulator.

A fourth embodiment will be described next with reference to FIGS. 15(a) to 18. FIGS. 15(a) to (c) are all views showing the schematic structure of the engine 3 incorporating a heat accumulator 41 according to the fourth embodiment in the cylinder block 2, and views as seen from a cylinder head mounting side of the cylinder block 2 with the cylinder head removed. FIGS. 15(a) to (c) show different states of the heat accumulator 41 during operation. FIG. 16 is an expanded cross-sectional view taken along a line J-J in FIG. 15(b). FIG. 17 is an expanded cross-sectional view taken along a line K-K in FIG. 15(c). FIG. 18 is a flowchart showing an example of a control for the heat accumulator 41. Note that the engine 3 in the present embodiment is a four-cylinder engine, and along with the cylinder block 2, is identical to the engine 3 in the other embodiments. However, a coolant temperature gauge 42 is depicted in FIG. 15 which has been omitted in the explanatory drawings of the other embodiments.

The heat accumulator 41, unlike that in other embodiments, is formed by combining a first container 45 and a second container 46 connected by a spring 44 with an actuator 43 attached to the cylinder block 2. However, the first container 45 and the second container 46 themselves are identical to the first container 22 and the second container 23 in the second and third embodiments.

The spring 44 of the present embodiment is different from the spring 6 of the first embodiment and the spring 32 of the third embodiment. In its initial state, the spring 44 is designed so as to exhibit a reaction force that separates the first container 45 and the second container 46. Therefore, the first container 45 and the second container 46 connected by the spring 44 are incorporated as separate from the cylinder bore wall 7 in their initial state, as shown in FIG. 15(a).

In addition, the role of the actuator 43 includes pressing the first container 45 and the second container 46, which are separated from the cylinder bore wall 7, towards the cylinder bore wall 7 side. Regarding this point, the actuator 43 differs from the actuator 12 in the other embodiments. However, the actuator 43 according to the present embodiment, similar to the actuator 12 in the other embodiments, also has the role of pressing the core generating trigger 11 provided in the first container 45 and the second container 46. The above-described actuator 43 is connected to an ECU 47. In addition, the ECU 47 is connected to the coolant temperature gauge 42, and generates an operation command for the actuator 43 on the basis of coolant temperature data from the coolant temperature gauge 42.

The operation of the heat accumulator 41 structured as described above will be explained next with reference to the flowchart shown in FIG. 18.

First, the ECU 47 determines whether an ignition key (not shown) that starts the engine 3 is in an ON state (step S01). Here, determining whether the ignition is in an ON state involves monitoring whether the engine 3 has been started. Therefore, in place of determining the ON state of the ignition, it is also possible to make a determination as to whether the driver side door has been opened, for example.

If "Yes" is determined at step S01, then the ECU 47 proceeds to step S02. On the other hand, if "No" is determined at step S01, then the processing at step S01 is repeated.

At step S02, the ECU 47 determines whether the coolant temperature is equal to or less than 58° C., based on the data from the coolant temperature gauge 42. Here, 58° C. corresponds to the melting temperature of the heat storage medium 9. If the coolant temperature has not reached the melting temperature of the heat storage medium, then latent heat from the heat storage medium 9 is utilized under the assumption of starting under cold start conditions in order to achieve early warming up of the engine 3.

If "No" is determined at step S02, i.e., if it is determined that the coolant temperature is higher than 58° C. and cold start conditions are not present, then the ECU 47 proceeds to step S06, where electric current to the actuator 43 is kept turned OFF and the process is then ended (END).

Meanwhile, if "Yes" is determined at step S02, i.e., if the coolant temperature is equal to or less than 58° C., then the ECU 47 proceeds to step S03, where the ECU 47 generates a command that turns ON electric current to the actuator 43. Note that the first container 45 and the second container 46 prior to running electric current to the actuator 43 are separated from the cylinder bore wall 7, as shown in FIG. 15(a).

The actuator 43 turned ON by electric current pushes out a needle 43a. Due to the needle 43a, the first container 45 and the second container 46 are pressed toward the cylinder bore wall 7 side. At this time, the needle 43a presses the core generating trigger 11. Thus, the first container 45 and the second container 46 come into close contact with the cylinder bore wall 7, as shown in FIGS. 15(b) and 16. In addition, the excessively cold heat storage medium 9 enclosed in the internal portion undergoes a change of phase and starts to release latent heat.

At step S03, the ECU 47 that generated the command to run current to the actuator 43 determines whether the engine 3 is in an operating state at step S04. In other words, the ECU 47 determines whether the engine 3 has started. If "No" is determined at step S04, i.e., if the engine 3 is not started, then the ECU 47 executes the processing at step S06 and subsequently ends the process (END).

On the other hand, if "Yes" is determined at step S04, i.e., if the engine 3 is started, then the ECU 47 proceeds to the processing at step S05. At step S05, the ECU 47 determines whether the coolant temperature is equal to or greater than 80° C., based on the data from the coolant temperature gauge 42. Here, 80° C. corresponds to a numerical value set with the aim of determining whether warming up is completed. If "No" is determined at step S05, i.e., if it is determined that warming up is not completed, then the ECU 47 returns to step S03 and repeats the processing at step S03 to step S04. In other words, electric current continues running to the actuator 43 and the first container 45 and the second container 46 remain in close contact with the cylinder bore wall 7 until it is determined that warming up is complete. By executing the above-described control, the latent heat of the heat storage medium 9 is efficiently transferred to the cylinder bore wall 7 to realize the quick completion of warming up.

Meanwhile, if "Yes" is determined at step S05, i.e., if it is determined that warming up is complete, then the ECU 47 proceeds to step S06 and generates a command to turn OFF the electric current to the actuator 43. This commands draws the needle 43a back into the actuator 43. Therefore, the first container 45 and the second container 46 separate from the cylinder bore wall 7 due to the reaction force of the spring 44, as shown in FIGS. 15(c) and 17. Under an environment where the coolant temperature exceeds 80° C., the heat storage medium 9 absorbs surrounding heat. However, by separating the first container 45 and the second container 46 from the cylinder bore wall 7, the heat of the cylinder bore wall 7 is not absorbed. In addition, coolant flows among the first container 45, the second container 46 and the cylinder bore wall 7.

Therefore, cooling of the cylinder bore wall 7 can be achieved even under thermal operating conditions such as during high-load, high-speed operation.

The above embodiments are merely examples for carrying out the present invention. These do not limit the present invention, and various modifications of the above embodiments are all within the scope of the present invention. It is also obvious from the above description that other diverse embodiments are also possible within the scope of the present invention.

The invention claimed is:

1. A heat accumulator comprising:
a container that is accommodated inside a water jacket, which is provided so as to surround a cylinder bore wall;
a heat storage medium that is enclosed within the container; and
clearance adjustment means for adjusting a clearance between the container and the cylinder bore wall depending on an operating condition of an engine or a combination of heat storage medium and coolant temperatures.

2. The heat accumulator according to claim 1, wherein the clearance adjustment means is provided in the container.

3. The heat accumulator according to claim 1, wherein the container includes a plurality of containers having wall shapes that respectively correspond to an outer peripheral shape of the cylinder bore wall.

4. The heat accumulator according to claim 1, wherein the container includes a plurality of containers having wall shapes that respectively correspond to an outer peripheral shape of the cylinder bore wall, and the plurality of containers is connected by a connecting member.

5. The heat accumulator according to claim 1, wherein the container includes a plurality of containers having wall shapes that respectively correspond to an outer peripheral shape of the cylinder bore wall, and the clearance adjustment means comprises:
a spring that connects the plurality of containers forming the container, and
a flexible structural part that is provided on a wall facing the cylinder bore wall of the plurality of containers and that projects outward in accordance with an expansion of the heat storage medium.

6. The heat accumulator according to claim 1, wherein the container includes a plurality of containers having wall shapes that respectively correspond to an outer peripheral shape of the cylinder bore wall, wherein the plurality of containers is connected by a spring, a flexible structural part that is provided on a wall facing the cylinder bore wall projects outward in accordance with an expansion of the heat storage medium, and the plurality of containers is accommodated inside the water jacket so as to closely contact the cylinder bore wall due to the attraction force of the spring.

7. The heat accumulator according to claim 1, wherein the clearance adjustment means is an expansion-contraction mechanism that expands and contracts depending on a temperature, and connects the plurality of containers that forms the container.

8. The heat accumulator according to claim 1, wherein the container includes a plurality of containers having wall shapes that respectively correspond to an outer peripheral shape of the cylinder bore wall, wherein the plurality of containers is connected by an expansion-contraction mechanism that expands and contracts depending on a temperature, and is accommodated inside the water jacket so as to closely contact the cylinder bore wall.

9. The heat accumulator according to claim 1, wherein the clearance adjustment means is formed from a shape-memory metal that expands and contracts depending on a temperature, and is a connecting member that connects the plurality of containers forming the container.

10. The heat accumulator according to claim 1, wherein the container includes a plurality of containers having wall shapes that respectively correspond to an outer peripheral shape of the cylinder bore wall, wherein the plurality of containers is connected by a connecting member formed from a shape-memory metal that expands and contracts depending on a temperature, and is accommodated inside the water jacket so as to closely contact the cylinder bore wall.

11. The heat accumulator according to claim 1, wherein the clearance adjustment means includes a spring and a thermostat that connect the plurality of containers forming the container.

12. The heat accumulator according to claim 1, wherein the container includes a plurality of containers having wall shapes that respectively correspond to an outer peripheral shape of the cylinder bore wall, wherein the plurality of containers is connected by a spring and a thermostat, and is accommodated inside the water jacket so as to closely contact the cylinder bore wall due to the attraction force of the spring.

13. The heat accumulator according to claim 1, wherein the clearance adjustment means includes a spring that mutually separates the plurality of containers forming the container, and an actuator that presses the plurality of containers toward the cylinder bore wall side.

14. The heat accumulator according to claim 1, wherein the container includes a plurality of containers having wall shapes that respectively correspond to an outer peripheral shape of the cylinder bore wall, wherein the plurality of containers is connected by a spring, accommodated inside the water jacket so as to separate from the cylinder bore wall due to the reaction force of the spring, and pressed toward the cylinder bore wall side by the actuator.

15. The heat accumulator according to claim 1, wherein the container includes a plurality of containers having wall shapes that respectively correspond to an outer peripheral shape of the cylinder bore wall, and is provided on respective container side walls with a core generating trigger that initiates a change of phase of the heat storage medium, wherein
the plurality of containers is connected by a spring, accommodated in the water jacket so as to separate from the cylinder bore wall due to the reaction force of the spring, and pressed toward the cylinder bore wall side while the core generating trigger is pressed by the actuator.

16. The heat accumulator according to claim 1, wherein the container includes a plurality of containers having wall shapes that respectively correspond to an outer peripheral shape of the cylinder bore wall, wherein
the plurality of containers is connected by a spring, accommodated in the water jacket so as to separate from the cylinder bore wall due to the reaction force of the spring, and pressed toward the cylinder bore wall side by the actuator, wherein
the actuator performs a pressing operation on the container when a coolant temperature is equal to or less than a melting temperature of the heat storage medium, and continues the pressing operation until the coolant temperature reaches a warm-up completion temperature.

17. The heat accumulator according to claim 1, wherein
the container includes a plurality of containers having wall shapes that respectively correspond to an outer peripheral shape of the cylinder bore wall, and is provided on respective container side walls with a core generating trigger that initiates a change of phase of the heat storage medium, wherein
the plurality of containers is connected by a spring, accommodated in the water jacket so as to separate from the cylinder bore wall due to the reaction force of the spring, and pressed toward the cylinder bore wall side while the core generating trigger is pressed by the actuator, wherein
the actuator performs a pressing operation on the container when a coolant temperature is equal to or less than a melting temperature of the heat storage medium, and continues the pressing operation until the coolant temperature reaches a warm-up completion temperature.

18. The heat accumulator according to claim 1, wherein
the container includes a first container and a second container having wall shapes that correspond to a shape of the cylinder bore wall.

19. An engine comprising a heat accumulator including:
a container that is accommodated inside a water jacket, which is provided so as to surround a cylinder bore wall;
a heat storage medium that is enclosed within the container; and
clearance adjustment means for adjusting a clearance between the container and the cylinder bore wall depending on an operating condition of an engine or heat storage medium and coolant temperatures.

* * * * *